US012791832B2

(12) United States Patent
Lee et al.

(10) Patent No.: US 12,791,832 B2
(45) Date of Patent: Nov. 10, 2026

(54) LENS MODULE AND DISPLAY DEVICE COMPRISING SAME

(71) Applicant: LG INNOTEK CO., LTD., Seoul (KR)

(72) Inventors: Tae Woo Lee, Seoul (KR); Jin Young Kim, Seoul (KR); Yang Hyun Joo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 291 days.

(21) Appl. No.: 18/565,835

(22) PCT Filed: May 31, 2022

(86) PCT No.: PCT/KR2022/007780
§ 371 (c)(1),
(2) Date: Nov. 30, 2023

(87) PCT Pub. No.: WO2022/255791
PCT Pub. Date: Dec. 8, 2022

(65) Prior Publication Data

US 2024/0255732 A1 Aug. 1, 2024

(30) Foreign Application Priority Data

Jun. 1, 2021 (KR) ........................ 10-2021-0071135
Nov. 2, 2021 (KR) ........................ 10-2021-0148709
Nov. 2, 2021 (KR) ........................ 10-2021-0149004

(51) Int. Cl.
*G02B 9/62* (2006.01)
*G02B 1/11* (2015.01)
*G02B 1/115* (2015.01)

(52) U.S. Cl.
CPC .................. *G02B 9/62* (2013.01); *G02B 1/11* (2013.01); *G02B 1/115* (2013.01)

(58) Field of Classification Search
CPC .. G02B 1/11; G02B 1/115; G02B 9/62; G02B 13/0045; G02B 13/0035–0045
See application file for complete search history.

(56) References Cited

U.S. PATENT DOCUMENTS

2005/0219705 A1* 10/2005 Tanaka .................. G02B 1/115 359/601
2021/0067713 A1* 3/2021 Voelker .................. H04N 23/55
2023/0073044 A1* 3/2023 Tsai ......................... G02B 5/04

FOREIGN PATENT DOCUMENTS

JP 2005-316386 A 11/2005
KR 2001-0014091 A 2/2001
(Continued)

OTHER PUBLICATIONS

International Search Report dated Sep. 6, 2022 in International Application No. PCT/KR2022/007780.

*Primary Examiner* — Jia X Pan
(74) *Attorney, Agent, or Firm* — SALIWANCHIK, LLOYD & EISENSCHENK

(57) ABSTRACT

A lens module according to one embodiment of the present invention comprises N lenses sequentially arranged from an object side to an image side, wherein: the N lens comprise a plurality of first coated lenses in which a first coating is applied to at least one surface thereof, and a plurality of second coated lenses in which a second coating is applied to at least one surface thereof; the first coating and the second coating have different thicknesses; and, in the plurality of first coated lenses, the angle (θ) between a line having a predetermined angle with respect to an optical axis and a normal line of a point in contact with the line on an object side surface is 50 degrees or higher.

13 Claims, 22 Drawing Sheets

(56) References Cited

FOREIGN PATENT DOCUMENTS

| | | | | | |
|---|---|---|---|---|---|
| KR | 10-2013-0126633 | A | | 11/2013 | |
| WO | WO-2015159592 | A1 | * | 10/2015 | ........... G02B 13/006 |
| WO | 2018/087432 | A1 | | 5/2018 | |

* cited by examiner

FIG. 9A

| 0 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 0 | 0 | 0 | 0 | 0 | 0 | 0 | 0 | 0 | 0 | 0 | 0 |
| angle of refract | 0 | 0 | 0 | 0 | 0 | 0 | 0 | 0 | 0 | 0 | 0 | 0 |
| **Y+** | | | | | | | | | | | | |
| angle of incidence | 43.78114 | 0.95606 | 21.27245 | 0.42839 | 4.35634 | 12.93744 | 12.45073 | 7.28138 | 9.60112 | 19.16155 | 33.2019 | 7.99128 |
| angle of refract | 26.75247 | 1.46965 | 12.40251 | 0.72365 | 2.83255 | 20.12911 | 7.33292 | 12.36231 | 6.09596 | 31.03238 | 20.40482 | 12.61206 |
| **Y-** | | | | | | | | | | | | |
| angle of incidence | 43.78114 | 0.95606 | 21.27245 | 0.42839 | 4.35634 | 12.93744 | 12.45073 | 7.28138 | 9.60112 | 19.16155 | 33.2019 | 7.99128 |
| angle of refract | 26.75247 | 1.46965 | 12.40251 | 0.72365 | 2.83255 | 20.12911 | 7.33292 | 12.36231 | 6.09596 | 31.03238 | 20.40482 | 12.61206 |
| **X+** | | | | | | | | | | | | |
| angle of incidence | 43.78114 | 0.95606 | 21.27245 | 0.42839 | 4.35634 | 12.93744 | 12.45073 | 7.28138 | 9.60112 | 19.16155 | 33.10995 | 7.8983 |
| angle of refract | 26.75247 | 1.46965 | 12.40251 | 0.72365 | 2.83255 | 20.12911 | 7.33292 | 12.36231 | 6.09596 | 31.03238 | 20.35253 | 12.46388 |
| **X-** | | | | | | | | | | | | |
| angle of incidence | 43.78114 | 0.95606 | 21.27245 | 0.42839 | 4.35634 | 12.93744 | 12.45073 | 7.28138 | 9.60112 | 19.16155 | 33.10995 | 7.8983 |
| angle of refract | 26.75247 | 1.46965 | 12.40251 | 0.72365 | 2.83255 | 20.12911 | 7.33292 | 12.36231 | 6.09596 | 31.03238 | 20.35253 | 12.46388 |

FIG. 9B

| 0.1 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| Chief | | | | | | | | | | | | |
| angle of incidence | 3.28272 | 3.65894 | 5.8446 | 3.89453 | 6.42851 | 3.59167 | 7.28977 | 4.66057 | 7.63529 | 1.51762 | 6.03304 | 6.13653 |
| angle of refract | 2.13498 | 5.62938 | 3.45608 | 6.58808 | 4.17717 | 5.5257 | 4.30794 | 7.88886 | 4.85281 | 2.38398 | 3.837 | 9.66539 |
| Y+ | | | | | | | | | | | | |
| angle of incidence | 45.90158 | 2.98027 | 18.9839 | 3.74525 | 4.86267 | 12.04633 | 11.7641 | 7.2624 | 8.76858 | 18.15077 | 35.05236 | 6.6486 |
| angle of refract | 27.85322 | 4.58379 | 11.10326 | 6.33488 | 3.16134 | 18.71111 | 6.93237 | 12.32977 | 5.56995 | 29.29267 | 21.44896 | 10.47716 |
| Y- | | | | | | | | | | | | |
| angle of incidence | 41.92183 | 4.08545 | 24.49286 | 3.26085 | 8.73497 | 14.41351 | 15.23365 | 8.76845 | 13.89601 | 19.13333 | 30.63076 | 12.6967 |
| angle of refract | 25.76367 | 6.28703 | 14.20723 | 5.51376 | 5.67002 | 22.49558 | 8.94872 | 14.92203 | 8.7956 | 30.98353 | 18.92926 | 20.19414 |
| X+ | | | | | | | | | | | | |
| angle of incidence | 46.51637 | 2.64838 | 17.88199 | 3.75619 | 3.52826 | 11.56809 | 10.92044 | 6.88737 | 7.36054 | 17.8607 | 35.38907 | 4.81032 |
| angle of refract | 28.16673 | 4.0728 | 10.47327 | 6.35343 | 2.29457 | 17.95309 | 6.43934 | 11.68702 | 4.67877 | 28.79709 | 21.63725 | 7.5682 |
| X- | | | | | | | | | | | | |
| angle of incidence | 41.21891 | 4.17079 | 25.26225 | 3.08696 | 9.06133 | 14.73585 | 15.57 | 8.87646 | 14.41035 | 19.14074 | 29.48637 | 13.41629 |
| angle of refract | 25.38439 | 6.41868 | 14.63388 | 5.21918 | 5.88086 | 23.01559 | 9.14311 | 15.1087 | 9.11706 | 30.99636 | 18.26388 | 21.37174 |

FIG. 9C

| 0.2 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 6.50325 | 7.25052 | 11.61624 | 7.71803 | 12.79692 | 7.09477 | 14.10072 | 8.77457 | 14.7471 | 1.99017 | 10.46895 | 11.20397 |
| angle of refract | 4.22561 | 11.18598 | 6.84604 | 13.11205 | 8.28517 | 10.94395 | 8.29248 | 14.93261 | 9.32728 | 3.12668 | 6.64342 | 17.76846 |
| **Y+** | | | | | | | | | | | | |
| angle of incidence | 48.20209 | 6.21797 | 17.92926 | 7.15889 | 9.41546 | 11.78665 | 12.89714 | 8.19494 | 10.98621 | 15.94364 | 35.05594 | 8.9828 |
| angle of refract | 29.01276 | 9.58351 | 10.50036 | 12.15227 | 6.10951 | 18.29926 | 7.59295 | 13.93266 | 6.9693 | 25.5584 | 21.45096 | 14.19544 |
| **Y-** | | | | | | | | | | | | |
| angle of incidence | 40.39041 | 7.50744 | 28.31013 | 6.68012 | 13.96862 | 16.32121 | 19.52747 | 11.41462 | 19.84383 | 18.41738 | 28.32781 | 17.538 |
| angle of refract | 24.93363 | 11.58548 | 16.30501 | 11.33224 | 9.03529 | 25.59195 | 11.41301 | 19.5303 | 12.48197 | 29.74959 | 17.5852 | 28.24754 |
| **X+** | | | | | | | | | | | | |
| angle of incidence | 49.34215 | 5.78501 | 15.42092 | 7.11106 | 7.88303 | 10.67682 | 10.97662 | 7.34421 | 8.12729 | 15.10052 | 35.21179 | 6.45666 |
| angle of refract | 29.57324 | 8.91294 | 9.05698 | 12.07027 | 5.11915 | 16.54553 | 6.4722 | 12.47012 | 5.16429 | 24.15222 | 21.53818 | 10.17275 |
| **X-** | | | | | | | | | | | | |
| angle of incidence | 38.90699 | 7.54952 | 29.59527 | 6.42289 | 14.1755 | 16.8475 | 19.91161 | 11.53013 | 20.53481 | 18.20538 | 25.7741 | 18.6283 |
| angle of refract | 24.11688 | 11.65095 | 16.99985 | 10.89233 | 9.16751 | 26.45472 | 11.63148 | 19.73331 | 12.90523 | 29.38615 | 16.07242 | 30.11204 |

FIG. 9D

| 0.3 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 9.62462 | 10.73578 | 17.28478 | 11.42938 | 19.09252 | 10.44909 | 20.11921 | 11.94422 | 20.92658 | 0.77592 | 12.30407 | 14.7974 |
| angle of refract | 6.24449 | 16.63844 | 10.13072 | 19.55623 | 12.28648 | 16.18689 | 11.74941 | 20.46259 | 13.14468 | 1.21872 | 7.79797 | 23.6491 |
| **Y+** | | | | | | | | | | | | |
| angle of incidence | 50.61427 | 9.33997 | 18.19557 | 10.48104 | 14.55299 | 12.06028 | 14.92001 | 9.40364 | 13.70055 | 12.96355 | 32.52973 | 11.66449 |
| angle of refract | 30.18705 | 14.44552 | 10.65283 | 17.89554 | 9.40857 | 18.73326 | 8.76728 | 16.02138 | 8.67333 | 20.63017 | 20.02175 | 18.51449 |
| **Y-** | | | | | | | | | | | | |
| angle of incidence | 39.22302 | 10.89812 | 32.48063 | 10.01588 | 19.3405 | 18.49454 | 24.66011 | 14.57986 | 26.3165 | 17.40716 | 26.58972 | 21.23876 |
| angle of refract | 24.2919 | 16.89442 | 18.53661 | 17.08484 | 12.44244 | 29.1823 | 14.30013 | 25.16465 | 16.39558 | 28.02527 | 16.558 | 34.6776 |
| **X+** | | | | | | | | | | | | |
| angle of incidence | 52.19869 | 8.77756 | 14.20357 | 10.37546 | 12.95614 | 10.2102 | 12.10435 | 8.17876 | 9.90621 | 11.41806 | 32.02627 | 9.10638 |
| angle of refract | 30.93375 | 13.56567 | 8.35215 | 17.71132 | 8.38722 | 15.81107 | 7.13094 | 13.90479 | 6.28852 | 18.11504 | 19.73357 | 14.39324 |
| **X-** | | | | | | | | | | | | |
| angle of incidence | 36.8954 | 10.90727 | 34.11609 | 9.6671 | 19.34683 | 19.15231 | 25.11646 | 14.84306 | 27.30548 | 16.91305 | 22.83046 | 22.55252 |
| angle of refract | 22.99041 | 16.90886 | 19.39227 | 16.47853 | 12.44641 | 30.2844 | 14.55318 | 25.6407 | 16.98228 | 27.18849 | 14.3026 | 37.03999 |

FIG. 9E

| 0.4 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 12.58576 | 14.04899 | 22.77129 | 14.95854 | 25.2491 | 13.57039 | 25.02397 | 13.87877 | 25.41496 | 2.37545 | 11.06464 | 16.86566 |
| angle of refract | 8.14976 | 21.90899 | 13.24611 | 25.84998 | 16.11141 | 21.14102 | 14.50194 | 23.90277 | 15.85792 | 3.73245 | 7.01868 | 27.10844 |
| **Y+** | | | | | | | | | | | | |
| angle of incidence | 53.05131 | 12.25916 | 19.56524 | 13.64674 | 19.73603 | 12.67787 | 17.10356 | 10.54494 | 15.62005 | 10.67698 | 27.53663 | 13.38168 |
| angle of refract | 31.32711 | 19.04911 | 11.43451 | 23.48701 | 12.69089 | 19.71529 | 10.02663 | 18.0071 | 9.8713 | 16.91711 | 17.11893 | 21.31498 |
| **Y-** | | | | | | | | | | | | |
| angle of incidence | 38.44124 | 14.17136 | 36.79423 | 13.20455 | 24.66988 | 20.76773 | 30.06493 | 17.67478 | 32.5468 | 16.53185 | 25.09169 | 23.55859 |
| angle of refract | 23.85796 | 22.10574 | 20.76721 | 22.6972 | 15.75613 | 33.02641 | 17.25224 | 30.8548 | 20.03151 | 26.54571 | 15.66449 | 38.88415 |
| **X+** | | | | | | | | | | | | |
| angle of incidence | 55.00669 | 11.55069 | 14.33409 | 13.47962 | 18.13265 | 10.04709 | 13.76799 | 9.08431 | 11.90432 | 8.4901 | 26.0236 | 10.80397 |
| angle of refract | 32.20594 | 17.92555 | 8.42784 | 23.18813 | 11.68149 | 15.55472 | 8.09933 | 15.46822 | 7.54686 | 13.40784 | 16.22119 | 17.12204 |
| **X-** | | | | | | | | | | | | |
| angle of incidence | 35.23518 | 14.16374 | 38.67466 | 12.76151 | 24.45944 | 21.51788 | 30.81297 | 18.33545 | 34.13726 | 15.86602 | 20.82059 | 25.03689 |
| angle of refract | 22.04528 | 22.09349 | 21.71173 | 21.90898 | 15.62679 | 34.31868 | 17.65246 | 32.09931 | 20.93455 | 25.4285 | 13.07994 | 41.65782 |

FIG. 9F

| 0.5 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 15.35608 | 17.15817 | 28.04404 | 18.27085 | 31.25363 | 16.40866 | 28.60616 | 14.42059 | 26.40819 | 6.44276 | 6.75981 | 17.20772 |
| angle of refract | 9.92062 | 26.96593 | 16.16038 | 31.97709 | 19.72686 | 25.73504 | 16.4656 | 24.87721 | 16.45011 | 10.15071 | 4.29802 | 27.68701 |
| **Y+** | | | | | | | | | | | | |
| angle of incidence | 55.45243 | 14.94636 | 21.65237 | 16.62446 | 24.88354 | 13.45899 | 19.17304 | 11.48253 | 17.86241 | 10.11848 | 21.14554 | 13.61977 |
| angle of refract | 32.4016 | 23.35585 | 12.61692 | 28.89958 | 15.8873 | 20.96264 | 11.21112 | 19.64964 | 11.26203 | 16.01743 | 13.27834 | 21.70581 |
| **Y-** | | | | | | | | | | | | |
| angle of incidence | 38.02816 | 17.28455 | 41.12446 | 16.21876 | 29.90293 | 23.02286 | 35.29901 | 20.23873 | 37.71946 | 16.44786 | 23.48178 | 24.42512 |
| angle of refract | 23.62734 | 27.17431 | 22.91431 | 28.15139 | 18.92516 | 36.95282 | 20.00372 | 35.75702 | 22.92525 | 26.4044 | 14.69642 | 40.50007 |
| **X+** | | | | | | | | | | | | |
| angle of incidence | 57.71676 | 14.0802 | 15.53841 | 16.38548 | 23.3442 | 10.07843 | 15.78447 | 9.81067 | 16.40195 | 7.59283 | 18.32207 | 10.9334 |
| angle of refract | 33.3676 | 21.95915 | 9.12486 | 28.45839 | 14.93916 | 15.60397 | 9.26695 | 16.72796 | 10.35738 | 11.97746 | 11.54583 | 17.33106 |
| **X-** | | | | | | | | | | | | |
| angle of incidence | 33.93823 | 17.27531 | 43.18366 | 15.68286 | 29.47883 | 23.84824 | 36.64924 | 21.52796 | 40.39344 | 15.69455 | 19.40492 | 26.07825 |
| angle of refract | 21.29781 | 27.15907 | 23.89904 | 27.16869 | 18.67197 | 38.42381 | 20.69365 | 38.30597 | 24.36839 | 25.14188 | 12.21252 | 43.66439 |

FIG. 9G

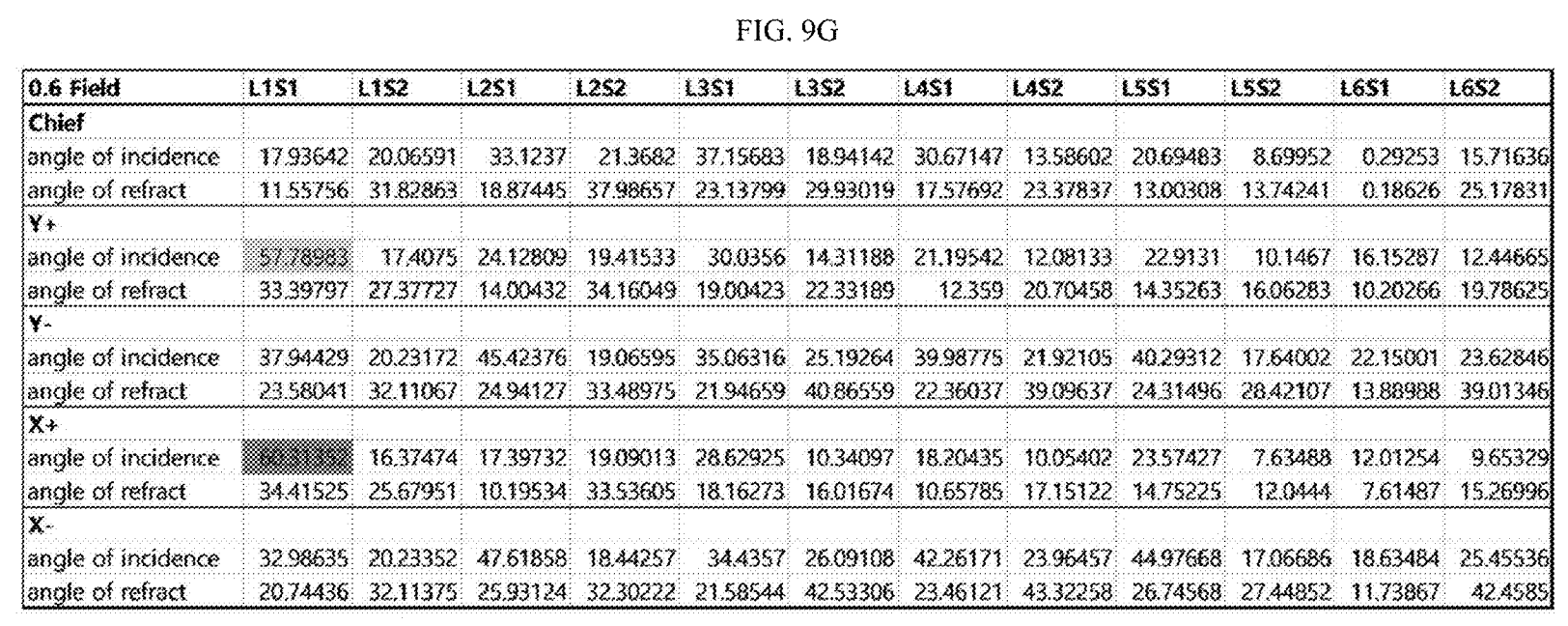

| 0.6 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 17.93642 | 20.06591 | 33.1237 | 21.3682 | 37.15683 | 18.94142 | 30.67147 | 13.58602 | 20.69483 | 8.69952 | 0.29253 | 15.71636 |
| angle of refract | 11.55756 | 31.82863 | 18.87445 | 37.98657 | 23.13799 | 29.93019 | 17.57692 | 23.37837 | 13.00308 | 13.74241 | 0.18626 | 25.17831 |
| **Y+** | | | | | | | | | | | | |
| angle of incidence | 57.78883 | 17.4075 | 24.12809 | 19.41533 | 30.0356 | 14.31188 | 21.19542 | 12.08133 | 22.9131 | 10.1467 | 16.15287 | 12.44665 |
| angle of refract | 33.39797 | 27.37727 | 14.00432 | 34.16049 | 19.00423 | 22.33189 | 12.359 | 20.70458 | 14.35263 | 16.06283 | 10.20266 | 19.78625 |
| **Y-** | | | | | | | | | | | | |
| angle of incidence | 37.94429 | 20.23172 | 45.42376 | 19.06595 | 35.06316 | 25.19264 | 39.98775 | 21.92105 | 40.29312 | 17.64002 | 22.15001 | 23.62846 |
| angle of refract | 23.58041 | 32.11067 | 24.94127 | 33.48975 | 21.94659 | 40.86559 | 22.36037 | 39.09637 | 24.31496 | 28.42107 | 13.88988 | 39.01346 |
| **X+** | | | | | | | | | | | | |
| angle of incidence | [illegible] | 16.37474 | 17.39732 | 19.09013 | 28.62925 | 10.34097 | 18.20435 | 10.05402 | 23.57427 | 7.63488 | 12.01254 | 9.65329 |
| angle of refract | 34.41525 | 25.67951 | 10.19534 | 33.53605 | 18.16273 | 16.01674 | 10.65785 | 17.15122 | 14.75225 | 12.0444 | 7.61487 | 15.26996 |
| **X-** | | | | | | | | | | | | |
| angle of incidence | 32.98635 | 20.23352 | 47.61858 | 18.44257 | 34.4357 | 26.09108 | 42.26171 | 23.96457 | 44.97668 | 17.06686 | 18.63484 | 25.45536 |
| angle of refract | 20.74436 | 32.11375 | 25.93124 | 32.30222 | 21.58544 | 42.53306 | 23.46121 | 43.32258 | 26.74568 | 27.44852 | 11.73867 | 42.4585 |

FIG. 9H

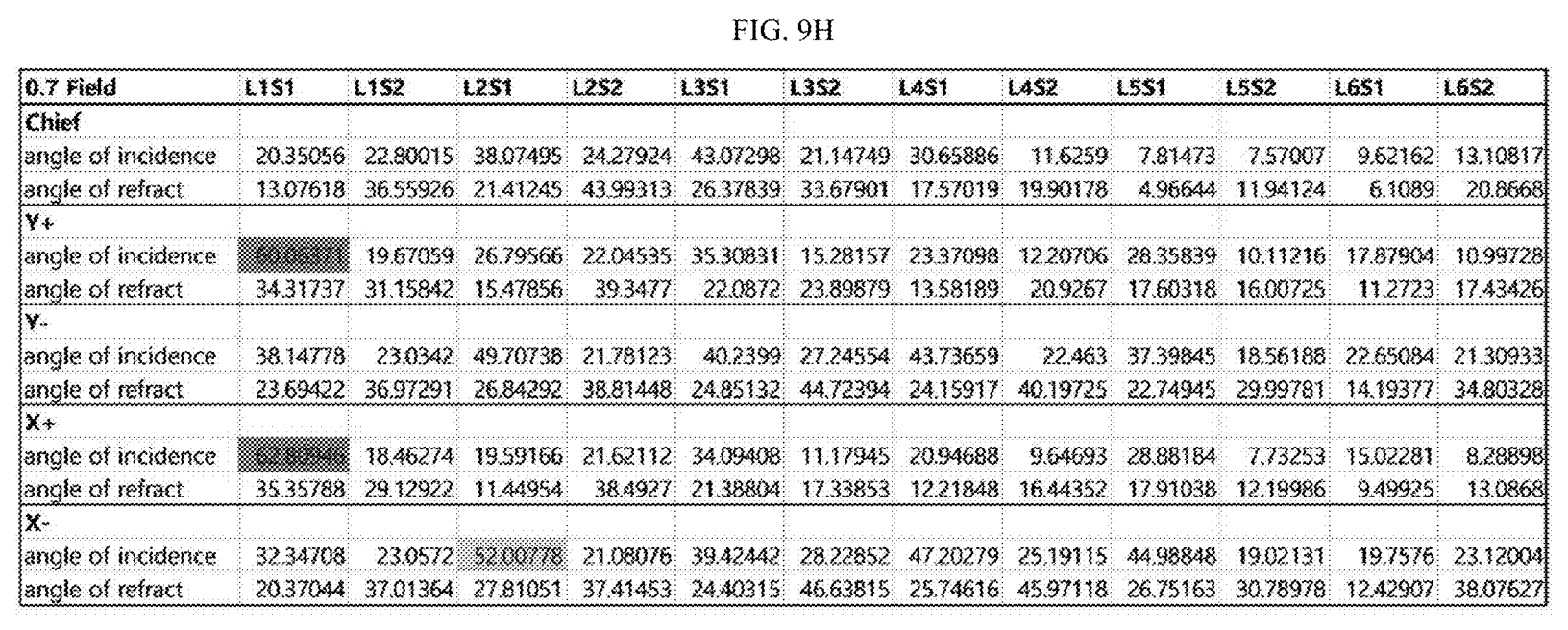

| 0.7 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 20.35056 | 22.80015 | 38.07495 | 24.27924 | 43.07298 | 21.14749 | 30.65886 | 11.6259 | 7.81473 | 7.57007 | 9.62162 | 13.10817 |
| angle of refract | 13.07618 | 36.55926 | 21.41245 | 43.99313 | 26.37839 | 33.67901 | 17.57019 | 19.90178 | 4.96644 | 11.94124 | 6.1089 | 20.8668 |
| **Y+** | | | | | | | | | | | | |
| angle of incidence | [redacted] | 19.67059 | 26.79566 | 22.04535 | 35.30831 | 15.28157 | 23.37098 | 12.20706 | 28.35839 | 10.11216 | 17.87904 | 10.99728 |
| angle of refract | 34.31737 | 31.15842 | 15.47856 | 39.3477 | 22.0872 | 23.89879 | 13.58189 | 20.9267 | 17.60318 | 16.00725 | 11.2723 | 17.43426 |
| **Y-** | | | | | | | | | | | | |
| angle of incidence | 38.14778 | 23.0342 | 49.70738 | 21.78123 | 40.2399 | 27.24554 | 43.73659 | 22.463 | 37.39845 | 18.56188 | 22.65084 | 21.30933 |
| angle of refract | 23.69422 | 36.97291 | 26.84292 | 38.81448 | 24.85132 | 44.72394 | 24.15917 | 40.19725 | 22.74945 | 29.99781 | 14.19377 | 34.80328 |
| **X+** | | | | | | | | | | | | |
| angle of incidence | [redacted] | 18.46274 | 19.59166 | 21.62112 | 34.09408 | 11.17945 | 20.94688 | 9.64693 | 28.88184 | 7.73253 | 15.02281 | 8.28898 |
| angle of refract | 35.35788 | 29.12922 | 11.44954 | 38.4927 | 21.38804 | 17.33853 | 12.21848 | 16.44352 | 17.91038 | 12.19986 | 9.49925 | 13.0868 |
| **X-** | | | | | | | | | | | | |
| angle of incidence | 32.34708 | 23.0572 | 52.00778 | 21.08076 | 39.42442 | 28.22852 | 47.20279 | 25.19115 | 44.98848 | 19.02131 | 19.7576 | 23.12004 |
| angle of refract | 20.37044 | 37.01364 | 27.81051 | 37.41453 | 24.40315 | 46.63815 | 25.74616 | 45.97118 | 26.75163 | 30.78978 | 12.42907 | 38.07627 |

FIG. 9I

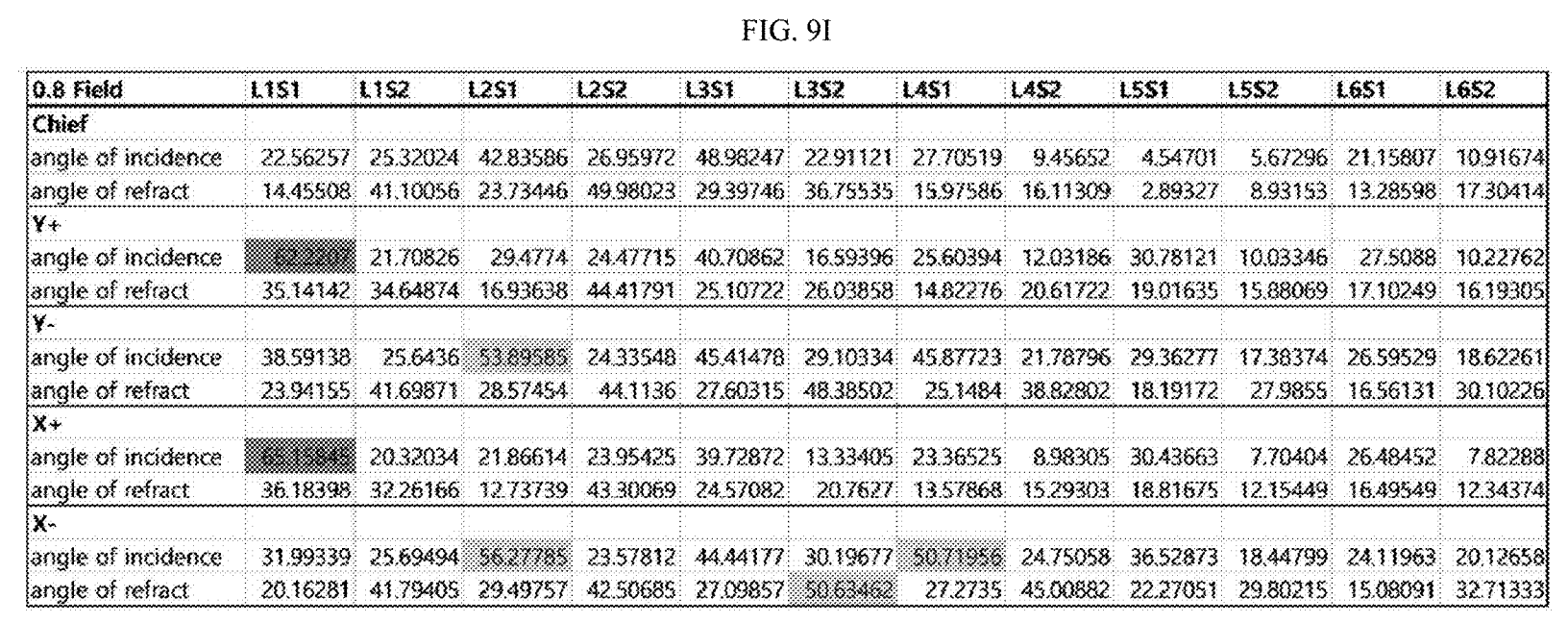

| 0.8 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 22.56257 | 25.32024 | 42.83586 | 26.95972 | 48.98247 | 22.91121 | 27.70519 | 9.45652 | 4.54701 | 5.67296 | 21.15807 | 10.91674 |
| angle of refract | 14.45508 | 41.10056 | 23.73446 | 49.98023 | 29.39746 | 36.75535 | 15.97586 | 16.11309 | 2.89327 | 8.93153 | 13.28598 | 17.30414 |
| **Y+** | | | | | | | | | | | | |
| angle of incidence | [illegible] | 21.70826 | 29.4774 | 24.47715 | 40.70862 | 16.59396 | 25.60394 | 12.03186 | 30.78121 | 10.03346 | 27.5088 | 10.22762 |
| angle of refract | 35.14142 | 34.64874 | 16.93638 | 44.41791 | 25.10722 | 26.03858 | 14.82276 | 20.61722 | 19.01635 | 15.88069 | 17.10249 | 16.19305 |
| **Y-** | | | | | | | | | | | | |
| angle of incidence | 38.59138 | 25.6436 | 53.89585 | 24.33548 | 45.41478 | 29.10334 | 45.87723 | 21.78796 | 29.36277 | 17.38374 | 26.59529 | 18.62261 |
| angle of refract | 23.94155 | 41.69871 | 28.57454 | 44.1136 | 27.60315 | 48.38502 | 25.1484 | 38.82802 | 18.19172 | 27.9855 | 16.56131 | 30.10226 |
| **X+** | | | | | | | | | | | | |
| angle of incidence | [illegible] | 20.32034 | 21.86614 | 23.95425 | 39.72872 | 13.33405 | 23.36525 | 8.98305 | 30.43663 | 7.70404 | 26.48452 | 7.82288 |
| angle of refract | 36.18398 | 32.26166 | 12.73739 | 43.30069 | 24.57082 | 20.7627 | 13.57868 | 15.29303 | 18.81675 | 12.15449 | 16.49549 | 12.34374 |
| **X-** | | | | | | | | | | | | |
| angle of incidence | 31.99339 | 25.69494 | 56.27785 | 23.57812 | 44.44177 | 30.19677 | 50.71956 | 24.75058 | 36.52873 | 18.44799 | 24.11963 | 20.12658 |
| angle of refract | 20.16281 | 41.79405 | 29.49757 | 42.50685 | 27.09857 | 50.63462 | 27.2735 | 45.00882 | 22.27051 | 29.80215 | 15.08091 | 32.71333 |

FIG. 9J

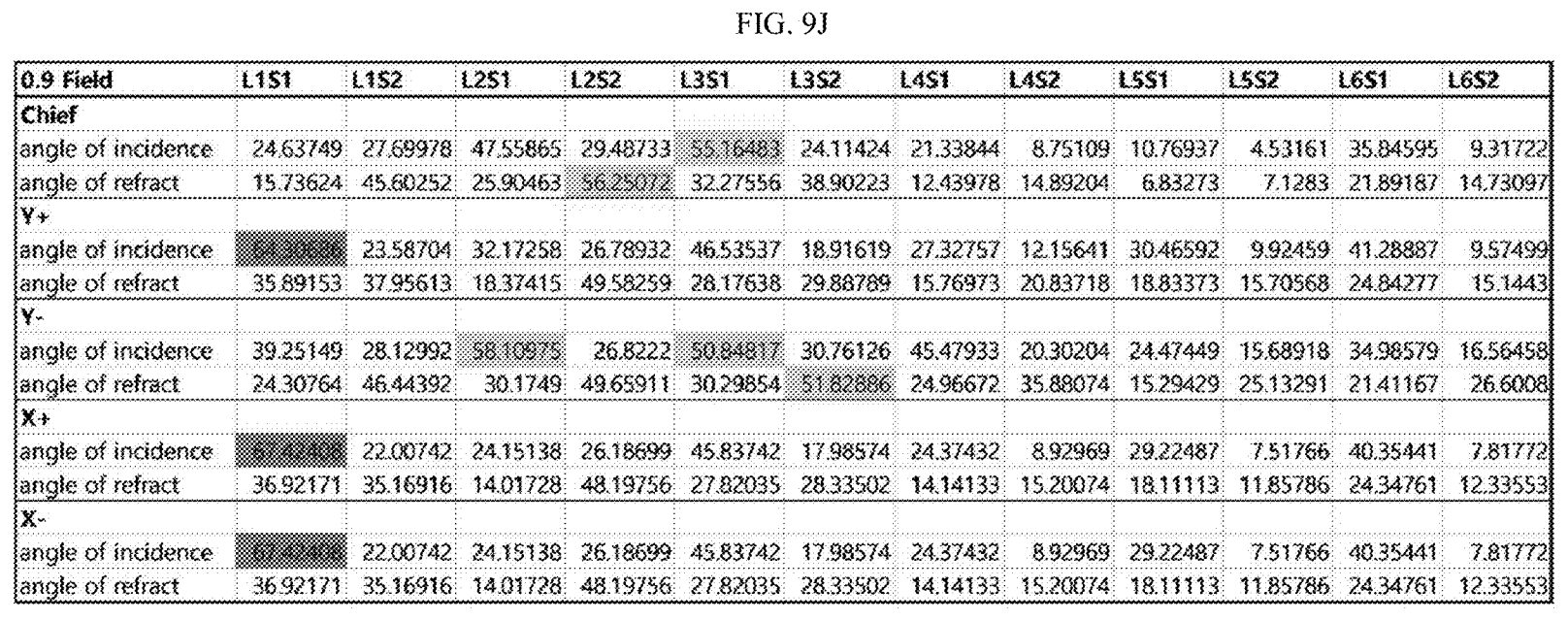

| 0.9 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 24.63749 | 27.69978 | 47.55865 | 29.48733 | 55.16483 | 24.11424 | 21.33844 | 8.75109 | 10.76937 | 4.53161 | 35.84595 | 9.31722 |
| angle of refract | 15.73624 | 45.60252 | 25.90463 | 56.25072 | 32.27556 | 38.90223 | 12.43978 | 14.89204 | 6.83273 | 7.1283 | 21.89187 | 14.73097 |
| **Y+** | | | | | | | | | | | | |
| angle of incidence | [illegible] | 23.58704 | 32.17258 | 26.78932 | 46.53537 | 18.91619 | 27.32757 | 12.15641 | 30.46592 | 9.92459 | 41.28887 | 9.57499 |
| angle of refract | 35.89153 | 37.95613 | 18.37415 | 49.58259 | 28.17638 | 29.88789 | 15.76973 | 20.83718 | 18.83373 | 15.70568 | 24.84277 | 15.1443 |
| **Y-** | | | | | | | | | | | | |
| angle of incidence | 39.25149 | 28.12992 | 58.10975 | 26.8222 | 50.84817 | 30.76126 | 45.47933 | 20.30204 | 24.47449 | 15.68918 | 34.98579 | 16.56458 |
| angle of refract | 24.30764 | 46.44392 | 30.1749 | 49.65911 | 30.29854 | 51.82886 | 24.96672 | 35.88074 | 15.29429 | 25.13291 | 21.41167 | 26.6008 |
| **X+** | | | | | | | | | | | | |
| angle of incidence | [illegible] | 22.00742 | 24.15138 | 26.18699 | 45.83742 | 17.98574 | 24.37432 | 8.92969 | 29.22487 | 7.51766 | 40.35441 | 7.81772 |
| angle of refract | 36.92171 | 35.16916 | 14.01728 | 48.19756 | 27.82035 | 28.33502 | 14.14133 | 15.20074 | 18.11113 | 11.85786 | 24.34761 | 12.33553 |
| **X-** | | | | | | | | | | | | |
| angle of incidence | [illegible] | 22.00742 | 24.15138 | 26.18699 | 45.83742 | 17.98574 | 24.37432 | 8.92969 | 29.22487 | 7.51766 | 40.35441 | 7.81772 |
| angle of refract | 36.92171 | 35.16916 | 14.01728 | 48.19756 | 27.82035 | 28.33502 | 14.14133 | 15.20074 | 18.11113 | 11.85786 | 24.34761 | 12.33553 |

FIG. 9K

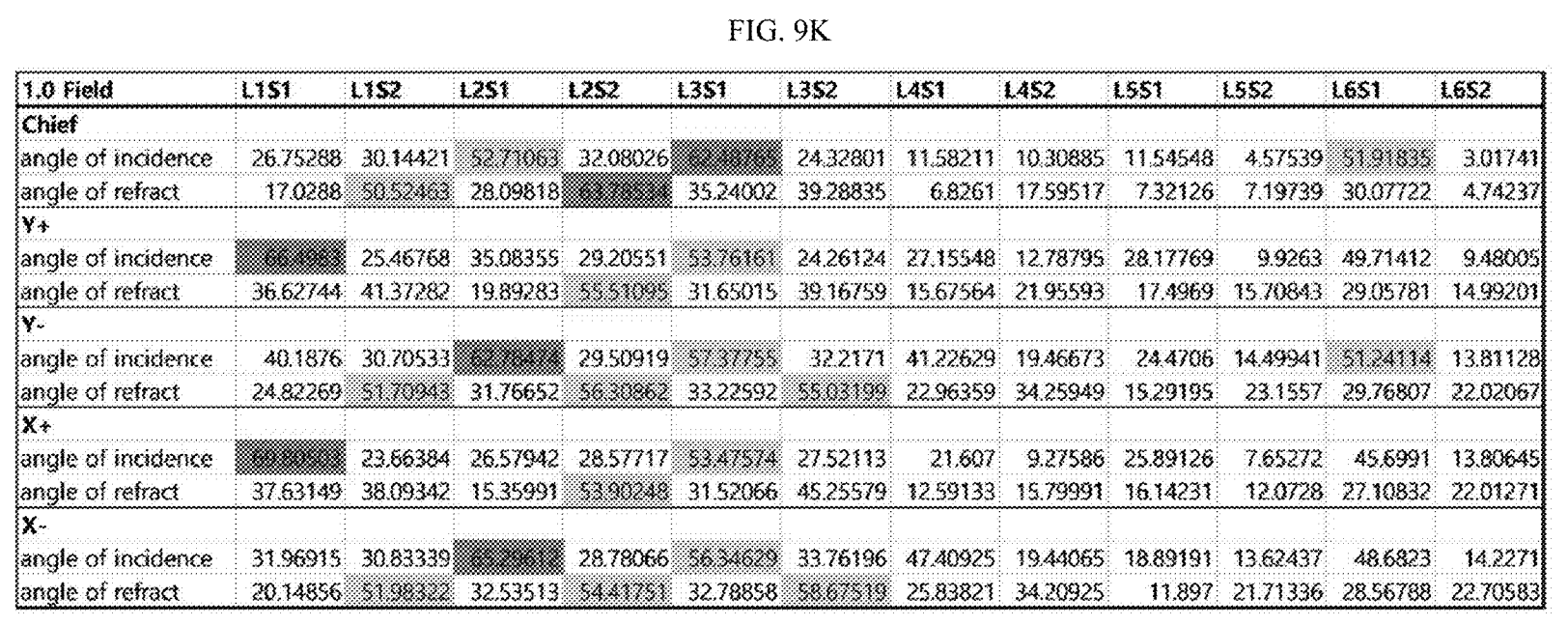

| 1.0 Field | L1S1 | L1S2 | L2S1 | L2S2 | L3S1 | L3S2 | L4S1 | L4S2 | L5S1 | L5S2 | L6S1 | L6S2 |
|---|---|---|---|---|---|---|---|---|---|---|---|---|
| **Chief** | | | | | | | | | | | | |
| angle of incidence | 26.75288 | 30.14421 | 52.71063 | 32.08026 | [illegible] | 24.32801 | 11.58211 | 10.30885 | 11.54548 | 4.57539 | 51.91835 | 3.01741 |
| angle of refract | 17.0288 | 50.52463 | 28.09818 | [illegible] | 35.24002 | 39.28835 | 6.8261 | 17.59517 | 7.32126 | 7.19739 | 30.07722 | 4.74237 |
| **Y+** | | | | | | | | | | | | |
| angle of incidence | [illegible] | 25.46768 | 35.08355 | 29.20551 | 53.76161 | 24.26124 | 27.15548 | 12.78795 | 28.17769 | 9.9263 | 49.71412 | 9.48005 |
| angle of refract | 36.62744 | 41.37282 | 19.89283 | 55.51095 | 31.65015 | 39.16759 | 15.67564 | 21.95593 | 17.4969 | 15.70843 | 29.05781 | 14.99201 |
| **Y-** | | | | | | | | | | | | |
| angle of incidence | 40.1876 | 30.70533 | [illegible] | 29.50919 | 57.37755 | 32.2171 | 41.22629 | 19.46673 | 24.4706 | 14.49941 | 51.24114 | 13.81128 |
| angle of refract | 24.82269 | 51.70943 | 31.76652 | 56.30862 | 33.22592 | 55.03199 | 22.96359 | 34.25949 | 15.29195 | 23.1557 | 29.76807 | 22.02067 |
| **X+** | | | | | | | | | | | | |
| angle of incidence | [illegible] | 23.66384 | 26.57942 | 28.57717 | 53.47574 | 27.52113 | 21.607 | 9.27586 | 25.89126 | 7.65272 | 45.6991 | 13.80645 |
| angle of refract | 37.63149 | 38.09342 | 15.35991 | 53.90248 | 31.52066 | 45.25579 | 12.59133 | 15.79991 | 16.14231 | 12.0728 | 27.10832 | 22.01271 |
| **X-** | | | | | | | | | | | | |
| angle of incidence | 31.96915 | 30.83339 | [illegible] | 28.78066 | 56.34629 | 33.76196 | 47.40925 | 19.44065 | 18.89191 | 13.62437 | 48.6823 | 14.2271 |
| angle of refract | 20.14856 | 51.98322 | 32.53513 | 54.41751 | 32.78858 | 58.67519 | 25.83821 | 34.20925 | 11.897 | 21.71336 | 28.56788 | 22.70583 |

LENS MODULE AND DISPLAY DEVICE COMPRISING SAME

CROSS-REFERENCE TO RELATED APPLICATIONS

This application is the U.S. national stage application of International Patent Application No. PCT/KR2022/007780, filed May 31, 2022, which claims the benefit under 35 U.S.C. § 119 of Korean Application Nos 10-2021-0071135, filed Jun. 1, 2021; 10-2021-0148709, filed Nov. 2, 2021; and 10-2021-0149004, filed Nov. 2, 2021; the disclosures of each of which are incorporated herein by reference in their entirety.

TECHNICAL FIELD

The present invention relates to a lens module, and more specifically, to a lens module including a coating layer formed of multiple layers, and a display device including the same.

BACKGROUND ART

With the continued development of display technologies, there is a growing demand to increase a displaying ratio in display devices such as mobile phones and tablet PCs. In order to increase an area of a display in the device, a camera may be disposed in a display region rather than in an existing bezel region. However, when the camera is positioned under a display panel, the amount of light reaching a lens becomes very small, thereby causing a problem. In particular, there is a problem in that light incident at a high angle has a low relative illumination, resulting in large Fresnel loss and increased peripheral noise. Therefore, in order to solve this problem, a lens design capable of increasing a relative illumination to light incident at a high angle is required.

Meanwhile, a display device used in an environment where external light is incident may not avoid less readability due to images forming on the display caused by external light or reflected external light. In order to solve this problem, various anti-reflective (AR) coatings have been proposed.

Therefore, the present invention intends to provide an optical system to which an anti-reflective coating capable of reducing a reflectance of light incident at a high angle and increasing a relative illumination is applied. The present invention may be used not only when a camera is disposed under a display panel but also in general cameras to improve an illumination of the camera, increase a relative illumination, and increase resolution power in a low illumination environment.

DISCLOSURE

Technical Problem

The present invention is directed to providing a lens module capable of reducing a reflectance and increasing a relative illumination, and a display device including the lens module.

Technical Solution

A lens module according to one embodiment of the present invention includes N lenses disposed sequentially from an object side to an image side thereof, wherein the N lenses include a plurality of first coated lenses in which a first coating is applied to at least one surface thereof, and a plurality of second coated lenses in which a second coating is applied to at least one surface thereof, thicknesses of the first coating and the second coating are different, and the plurality of first coated lenses are lenses in which an angle (θ) between a line at a predetermined angle with respect to an optical axis and a normal line of a point at which the line comes into contact with an object side surface is 50° or more.

The plurality of first coated lenses may be a first lens and a second lens among the N lenses, and the plurality of second coated lenses may be the remaining lenses among the N lenses except for the first lens and the second lens.

The first coating may be thicker than the second coating, and a difference between the thicknesses of the first coating and the second coating may be 10% or more of the thickness of the second coating.

The first coating may be applied to the object side surface and an image side surface of at least one of the plurality of first coated lenses, and the second coating may be applied to an object side surface and an image side surface of at least one of the plurality of second coated lenses.

A lens module according to another embodiment of the present invention includes N lenses disposed sequentially from an object side to an image side thereof, wherein the N lenses include a first coated lens to which a first coating is applied, and a second coated lens to which a second coating is applied, the first coating includes a first layer to an $X^{th}$ layer disposed sequentially on a surface of a lens, the second coating includes a first layer to a $Y^{th}$ layer disposed sequentially on a surface of a lens, the first layer has the smallest thickness among the first layer to the $X^{th}$ layer in the first coating, the first layer has the smallest thickness among the first layer to the $Y^{th}$ layer in the second coating, and a thickness of the $X^{th}$ layer of the first coating is greater than a thickness of the $Y^{th}$ layer of the second coating.

A thickness of an $(X-1)^{th}$ layer of the first coating may be greater than a thickness of a $(Y-1)^{th}$ layer of the second coating.

The thickness of the first coating may be greater than a thickness of the second coating, and a difference between the thickness of the first coating and the thickness of the second coating may be 10% or more of the thickness of the second coating.

A value of the X and a value of the Y may be the same.

The value of each of the X and the Y may be 8.

A first layer, a third layer, a fifth layer, and a seventh layer of each of the first coating and the second coating may be formed of a first material, a second layer, a fourth layer, a sixth layer, and an eighth layer of each of the first coating and the second coating may be formed of a second material, and a refractive index of the first material may be greater than a refractive index of the second material.

Each of the first material and the second material may include an oxide.

An object side surface and an image side surface of the first coated lens may include the first coating, and an object side surface and an image side surface of the second coated lens may include the second coating.

A first lens and a second lens among the N lenses may be the first coated lenses, and the remaining lenses among the N lenses except for the first lens and the second lens may be the second coated lenses. A transmittance of the first coating at an angle of incidence of 50° or more may be higher than a transmittance of the second coating at an angle of incidence of 50° or more, and a transmittance of the first coating at an angle of incidence of 0° or more and 40° or less may be lower than a transmittance of the second coating at an angle of incidence of 0° or more and 40° or less.

A lens module according to still another embodiment of the present invention includes a plurality of lenses disposed sequentially from an object side to an image side thereof, wherein the plurality of lenses include at least one first coated lens in which a first coating is applied to at least one surface thereof, and at least one second coated lens in which a second coating is applied to at least one surface thereof, a thickness of the first coating is 1.05 times or more a thickness of the second coating, the at least one first coated lens has the highest light transmittance within an angle of incidence in a range of 30° or more and 60° or less, and the at least one second coated lens has the highest light transmittance within an angle of incidence in a range of 0° or more and less than 30°.

The at least one first coated lens may be a lens in which a region in which an angle (θ) between a line at a predetermined angle with respect to an optical axis and a normal line of a point at which the line comes into contact with an object side surface of the lens is 50° or more is present.

The first coating may include a first layer to an $X^{th}$ layer disposed sequentially on a surface of the lens, the second coating may include a first layer to a $Y^{th}$ layer disposed sequentially on the surface of the lens, the first layer may have the smallest thickness among the first layer to the $X^{th}$ layer in the first coating, the first layer may have the smallest thickness among the first layer to the $Y^{th}$ layer in the second coating, and a thickness of each of the $X^{th}$ layer and an $(X-2)^{th}$ layer of the first coating may be greater than a thickness of each of the $Y^{th}$ layer and a $(Y-2)^{th}$ layer of the second coating.

A thickness of an $(X-1)^{th}$ layer of the first coating may be greater than a thickness of a $(Y-1)^{th}$ layer of the second coating.

A thickness of at least one of an $(X-3)^{th}$ layer and an $(X-5)^{th}$ layer of the first coating may be smaller than a thickness of at least one of a $(Y-3)^{th}$ layer and a $(Y-5)^{th}$ layer of the second coating.

The first coating may include a first layer to an $X^{th}$ layer disposed sequentially on a surface of a lens, the second coating may include a first layer to a $Y^{th}$ layer disposed sequentially on a surface of a lens, refractive indices of odd-numbered layers of the first layer to the $X^{th}$ layer may be greater than refractive indices of even-numbered layers thereof, the refractive indices of odd-numbered layers of the first layer to the $Y^{th}$ layer may be greater than refractive indices of even-numbered layers thereof, a thickness of each of the even-numbered layers of the first layer to the $X^{th}$ layer may be greater than a thickness of each of even-numbered layers of the first layer to the $Y^{th}$ layer, and a thickness of at least one of the odd-numbered layers of the first layer to the $X^{th}$ layer may be smaller than a thickness of at least one of the odd-numbered layers of the first layer to the $Y^{th}$ layer.

A lens module according to still another embodiment of the present invention includes a lens base, and a coating layer disposed on at least one surface of both surfaces of the lens base, wherein a region which has the highest light transmittance within an angle of incidence in a range of 30° or more and 60° or less and in which an angle (θ) between a line at a predetermined angle with respect to an optical axis and a normal line of a point at which the line comes into contact with an object side surface of the lens module is 50° or more is present.

The coating layer may include a first layer to an $X^{th}$ layer disposed sequentially on a surface of the lens base, refractive indices of odd-numbered layers of the first layer to the $X^{th}$ layer may be greater than refractive indices of even-numbered layers thereof, a thickness of the first layer among the first layer to the $X^{th}$ layer may be smaller than the thickness of the first layer, and the total thickness of the coating layer may be in a range of 70 to 90 times the thickness of the first layer.

A thickness of the $X^{th}$ layer among the first layer to the $X^{th}$ layer may be 19 times or more the thickness of the first layer, and a thickness of an $(X-2)^{th}$ layer among the first layer to the $X^{th}$ layer may be 1.5 times or more the thickness of the first layer.

A thickness of a second layer among the first layer to the $X^{th}$ layer may be 18 times or more the thickness of the first layer.

A thickness of an $(X-1)^{th}$ layer among the first layer to the $X^{th}$ layer may be 12.5 times or more the thickness of the first layer.

A thickness of an $(X-3)^{th}$ layer among the first layer to the $X^{th}$ layer may be 7.5 times or less the thickness of the first layer, and a thickness of an $(X-5)^{th}$ layer among the first layer to the $X^{th}$ layer may be 3 times or less the thickness of the first layer.

A light transmittance may be 98% or more at an angle of incidence of 50°.

A light transmittance may be 95% or more at an angle of incidence of 60°.

A light transmittance may be 88% or more at an angle of incidence of 70°.

Advantageous Effects

According to an embodiment of the present invention, it is possible to obtain a lens module capable of increasing a relative illumination and reducing Fresnel loss in a low-light environment. Therefore, in the lens module according to the embodiment of the present invention, it is possible to reduce noise of a peripheral portion with a much lower illumination than that of a center portion. In addition, according to an embodiment of the present invention, a lens module can be applied usefully in any environment with less light amount as well as when a camera is disposed under a display panel. In addition, according to an embodiment of the present invention, it is possible to increase an illumination of a peripheral portion without reducing the light amount of a center portion.

DESCRIPTION OF DRAWINGS

FIGS. 9A-9K are results of calculating the angle of incidence of the lens for each field in the lens module according to one embodiment of the present invention.

MODES OF THE INVENTION

Hereinafter, exemplary embodiments according to the present invention will be described in detail with reference to the accompanying drawings.

However, the technical spirit of the present disclosure is not limited to some of the described embodiments, but may be implemented in various different forms, and one or more of the components among the embodiments may be used by being selectively coupled or substituted without departing from the scope of the technical spirit of the present disclosure.

In addition, the terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

In addition, the terms used in the embodiments of the present invention are for describing the embodiments and are not intended to limit the present invention.

In the specification, a singular form may include a plural form unless otherwise specified in the phrase, and when described as "at least one (or one or more) of A, B, and C," one or more among all possible combinations of A, B, and C may be included.

In addition, the terms such as first, second, A, B, (a), and (b) may be used to describe components of the embodiments of the present disclosure. These terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the components are "connected," "coupled," or "joined" by other components present between the first component and the second component.

In addition, when a certain component is described as being formed or disposed on "on (above)" or "below (under)" another component, the terms "on (above)" or "below (under)" may include not only a case in which two components are in direct contact with each other, but also a case in which one or more other components are formed or disposed between the two components. In addition, when described as "on (above) or below (under)," it may include the meaning of not only an upward direction but also a downward direction based on one component.

Figure 1:
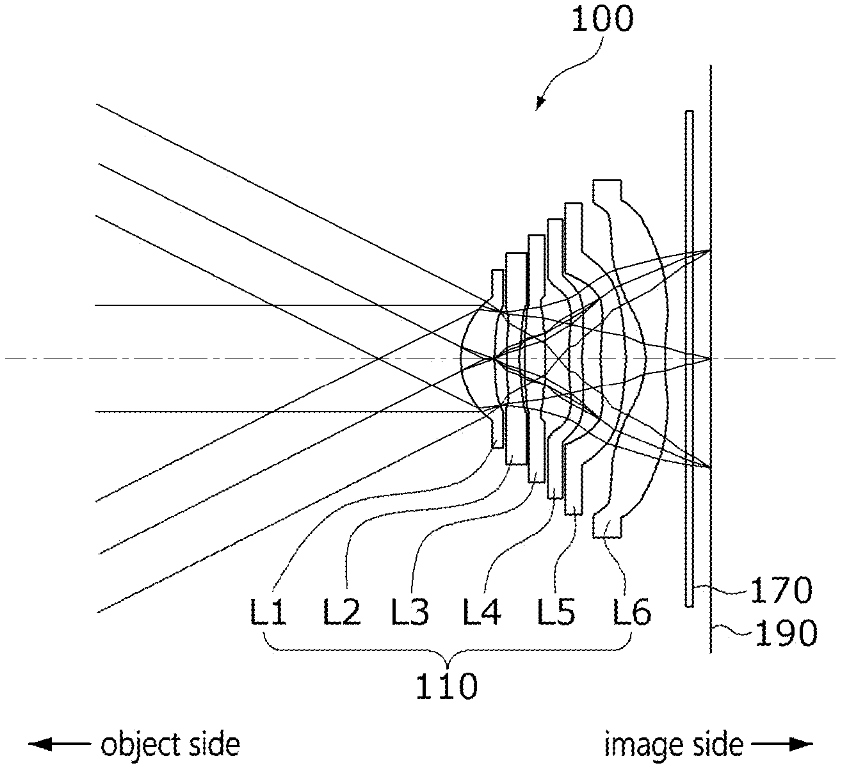
FIG. 1 is a cross-sectional view simply illustrating a lens module (100) according to one embodiment of the present invention.

FIG. 1 is a cross-sectional view simply illustrating a lens module 100 according to one embodiment of the present invention.

Referring to FIG. 1, the lens module 100 includes a plurality of lenses 110, for example, a first lens L1, a second lens L2, a third lens L3, a fourth lens L4, a fifth lens L5, and a sixth lens L6 arranged sequentially from an object side to an image side thereof. An image sensor 190 may be disposed at the image side, and a filter 170 may be disposed between the sixth lens L6 and the image sensor 190.

Light reflected from an object sequentially passes through the first lens to the sixth lens 110 and the filter 170 of the lens module 100 and is received by the image sensor 190.

The filter 170 may be an infrared (IR) filter. The filter 170 may block near-infrared rays, for example, light with a wavelength of 700 to 1100 nm, included in light incident on the lens module 100. Alternatively, near-infrared rays, for example, light with a wavelength of 700 to 1100 nm included in light incident on the lens module 100 may pass through the filter 170. In addition, the image sensor 190 may be connected to a printed circuit board by a wire.

The lens module 100 according to one embodiment of the present invention may include six lenses 110 as illustrated in FIG. 1, but the number thereof is not limited to six and may be selected appropriately in consideration of a space in which the lens module is positioned. In addition, the lens module according to one embodiment of the present invention is not limited to having a shape as illustrated in FIG. 1.

Meanwhile, the lens module 100 according to one embodiment of the present invention may include the lens 110 designed as expressed in Table 1 below.

TABLE 1

| Lens | Surface | Surface Type | Thickness (mm) | Y radius (mm) | Nd | Vd |
|---|---|---|---|---|---|---|
| Object | | | 500 | | | |
| L1 | s1 | Aspheric | 0.6244 | 1.5000 | 1.5348 | 55.71 |
| | s2 (stop) | Aspheric | 0.202 | 3.3151 | | |
| L2 | s3 | Aspheric | 0.23 | 5.2947 | 1.68 | 18.44 |
| | s4 | Aspheric | 0.0933 | 2.8840 | | |
| L3 | s5 | Aspheric | 0.3657 | 4.9410 | 1.5348 | 55.71 |
| | s6 | Aspheric | 0.4433 | −43.1316 | | |
| L4 | s7 | Aspheric | 0.23 | 3.6021 | 1.68 | 18.44 |
| | s8 | Aspheric | 0.3207 | 3.2282 | | |
| L5 | s9 | Aspheric | 0.4702 | 4.799806913 | 1.567 | 37.55 |

TABLE 1-continued

| Lens | Surface | Surface Type | Thickness (mm) | Y radius (mm) | Nd | Vd |
|---|---|---|---|---|---|---|
| | s10 | Aspheric | 0.4325 | −2.1281 | | |
| L6 | s11 | Zernike Polynomial | 0.5622 | −2.705725659 | 1.567 | 37.55 |
| | s12 | Zernike Polynomial | 0.11559 | 2.333769581 | | |
| IRCF | s13 | Flat | 0.11 | | | |
| | s14 | Flat | 0.27 | | | |
| Image | s15 | | | | | |

(* Y radius is a curvature radius)

However, the design of the lens 100 according to Table 1 is described for illustrative purposes for understanding the invention, and embodiments of the present invention are not limited to the design of the lens 100 according to Table 1.

According to one embodiment of the present invention, a coating layer is applied to the lens 100. Although the coating layer is not illustrated in FIG. 1, it may mean that the coating layer is formed on at least one surface of both surfaces of the lens, as will be described below. This coating layer may be formed on a substrate using conventional methods known to those skilled in the art, such as vacuum deposition, sputtering (physical deposition), chemical vapor deposition (CVD), and wet coating.

The lens module according to the embodiment of the present invention relates to a lens coating for increasing a relative illumination in an environment in which the relative illumination is low, and in particular, can reduce Fresnel loss of a peripheral portion with a much lower light amount than a center portion and reduce noise generated during lens shading correction (LSC). The center portion is a center region of an image sensor and is a region close to field 0 of the image sensor, as will be described below. The peripheral portion is a peripheral region of the image sensor and is a region close to field 1 of the image sensor, as will be described below. In the specification, the relative illumination is an illumination of the peripheral region to the center portion of an image surface.

When capturing is made with a typical lens, lens shading in which the center portion is bright and the peripheral portion is dark occurs. In particular, this phenomenon becomes more noticeable as the size of the lens becomes smaller like cameras included in smartphones. This is a phenomenon that occurs because light incident on the lens at a low angle appears bright due to a high transmittance, but light incident on the lens at a high angle appears due to a low transmittance.

Figure 2:
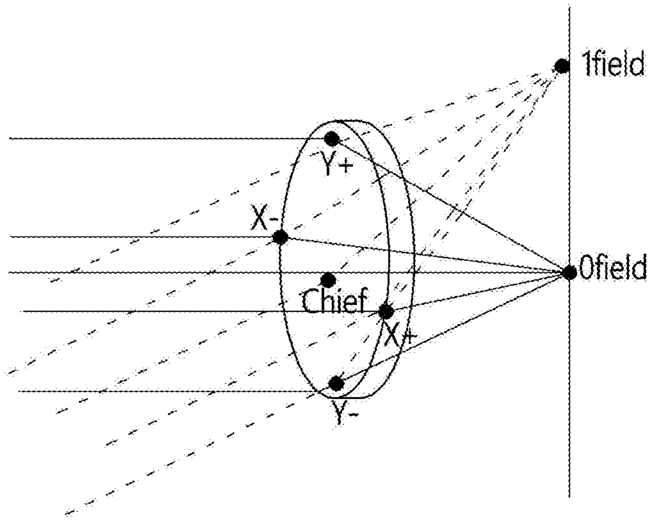
FIG. 2 illustrates an optical path in which light incident on a lens reaches an image sensor according to one embodiment of the present invention.

In order to specifically describe this, referring to FIG. 2 schematically illustrating an optical path through which light incident on the lens reaches the image sensor, it can be seen that a region in which the light reaches on the image sensor varies depending on an angle of incidence of light incident from the object side. In other words, the image sensor is divided into field region 0, which is the center of the image sensor, and field region 1, which is the furthest position from the center of the image sensor, and most of the light reaching close to the field region 1 (peripheral portion) of the image sensor enters the lens at a high angle, and most of the light reaching close to the field region 0 (center portion) of the image sensor is incident on the lens at a low angle. Here, the high angle is an angle of 40° or more, preferably, 45° or more, and more preferably, 50° or more.

When the lens shading correction is applied in an environment with a low relative illumination, there is no significant difference in the field region 0 of the image sensor, but the closer to the field region 1, the more noise occurs. This can be confirmed through FIGS. 3 and 4.

Figure 3A:
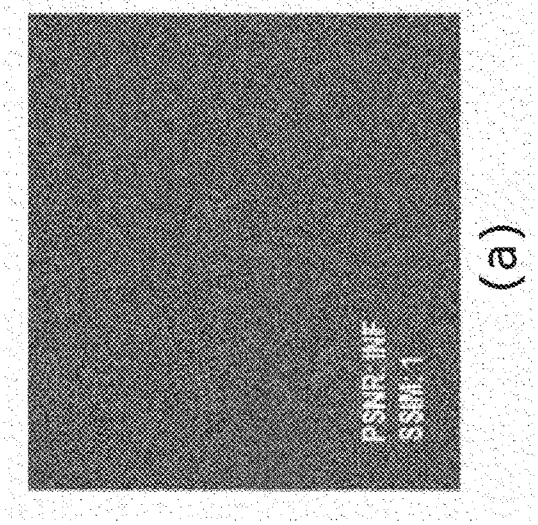
FIGS. 3A-3C illustrate a result of performing a lens shading correction of a field region 0 in an environment in which relative illuminations are different.
Figure 3B:
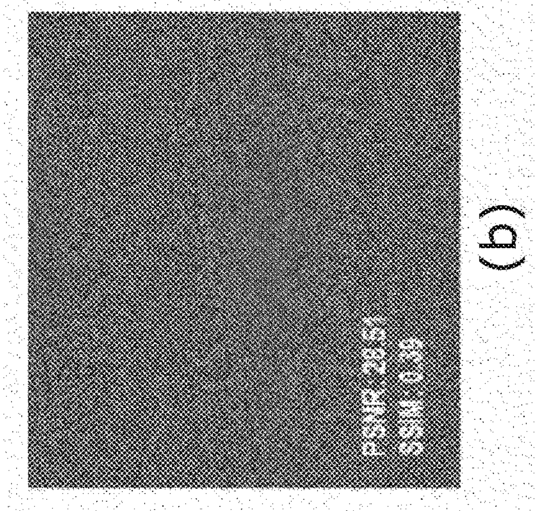
Figure 3C:
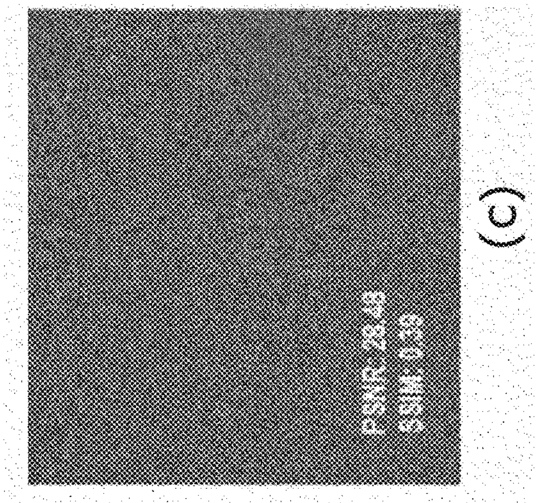

FIGS. 3A-3C illustrate a result of performing a lens shading correction of a field region 0 in an environment in which relative illuminations are different. FIG. 3A is a result of performing the lens shading correction in an environment in which the relative illumination is 70%, FIG. 3B is a result of performing the lens shading correction in an environment in which the relative illumination is 40%, and FIG. 3C is a result of performing the lens shading correction in an environment in which the relative illumination is 20%. Therefore, it can be seen that there is no significant difference in the results before and after the lens shading correction in the field region 0 of the image sensor.

Figure 4A:
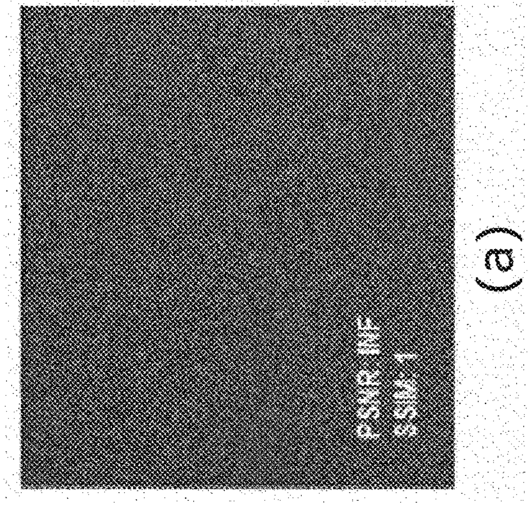
FIGS. 4A-4C illustrate a result of performing a lens shading correction of a field region 1 in an environment in which the relative illumination is different.
Figure 4B:
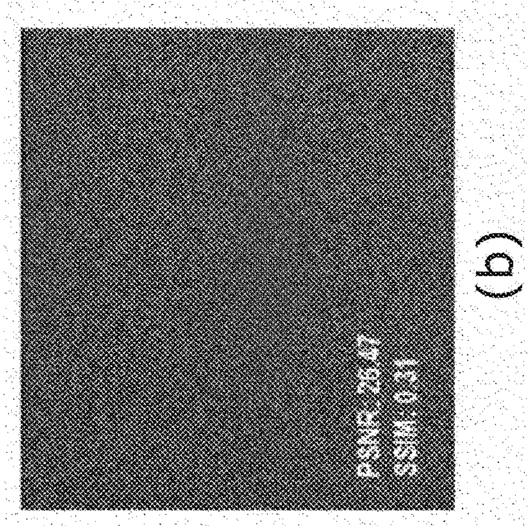
Figure 4C:
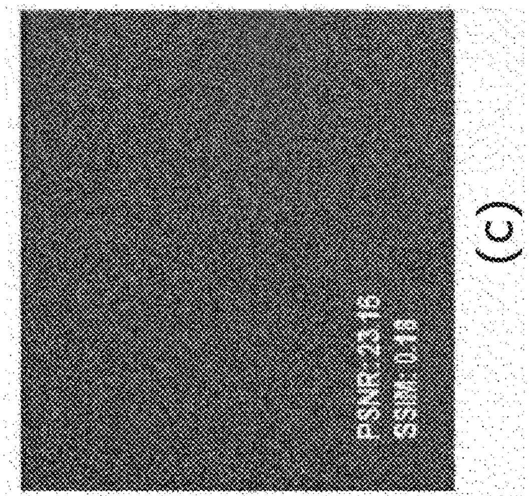

On the other hand, FIGS. 4A-4C illustrate results of performing the lens shading correction in the field region 1 in an environment with different relative illuminations, and FIG. 4A is a result of performing the lens shading correction in an environment in which the relative illumination is 70%, FIG. 4B is a result of performing the lens shading correction in an environment in which the relative illumination is 40%, and FIG. 4C is a result of performing the lens shading correction in an environment in which the relative illumination is 20%. Therefore, it can be seen that there is a significant difference because noise increases in the field region 1 of the image sensor when the lens shading correction is performed. In particular, when the relative illumination is very low at 20% as illustrated in FIG. 4C, it can be seen that noise greatly increases during correction.

In addition, comparing FIGS. 3A-3C to FIGS. 4A-4C, it can be seen that a PNSR value that has a higher value as the loss is less appears lower in FIGS. 4A-4C and particularly appears much lower in FIG. 4C. In addition, it can be seen that an SSIM value representing a difference between a human visual quality and a recognized image appears lower in FIGS. 4A-4C and particularly appears much lower in FIG. 4C. Therefore, it can be seen that a degree of image damage increases when the lens shading correction is performed in the field region 1 and an environment with a low illumination.

The lens module according to the embodiment of the present invention relates to a lens coating for increasing the relative illumination in the environment in which the relative illumination is low and is particularly to increase the illumination in a region close to field 1 with a lower illumination than the center portion.

The present invention provides performing coating on a lens for achieving this effect and specifically means forming a coating layer on a surface of the lens. In other words, the surface of the lens may be a surface (hereinafter referred to as an object side surface) facing the object side or a surface (hereinafter referred to as an image side surface) facing the image side based on the lens (i.e., a lens substrate) and means that one or more surfaces among them are coated with a coating layer according to the embodiment of the present invention.

Figure 5:
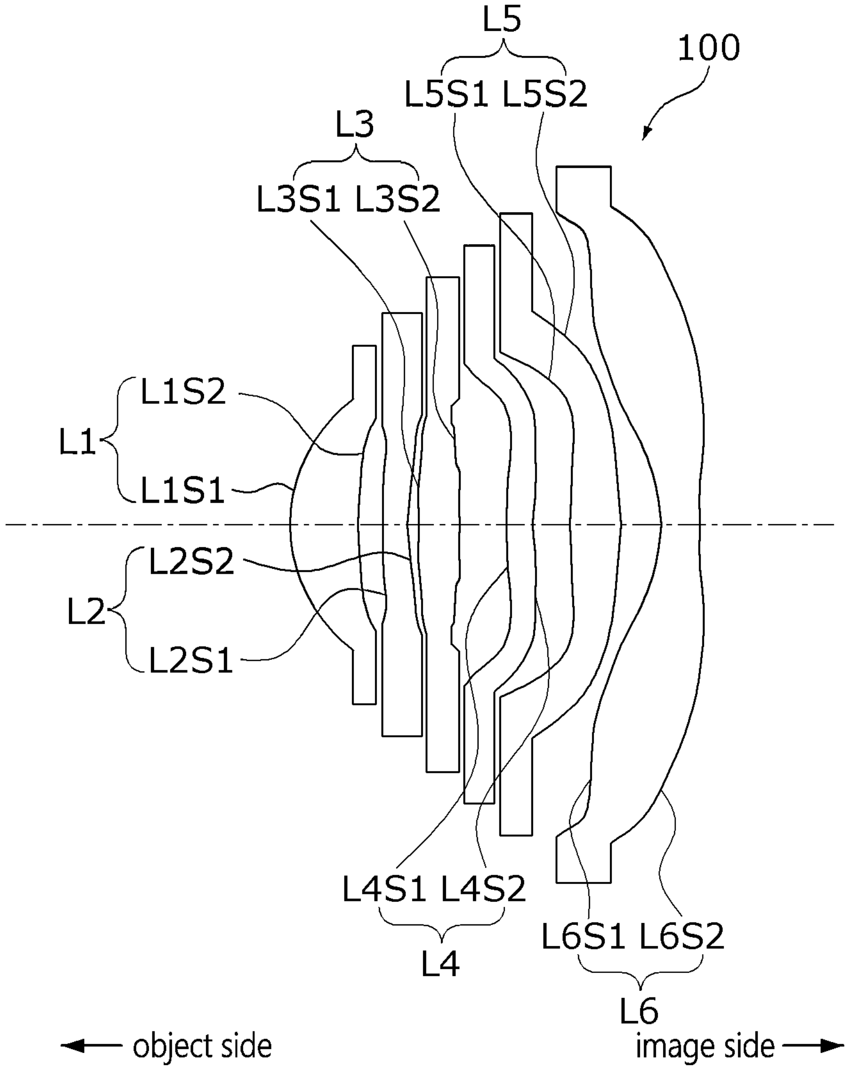
FIG. 5 is a cross-sectional view of the lens module according to one embodiment of the present invention.

FIG. 5 is a cross-sectional view of the lens module according to one embodiment of the present invention. The number of lenses, a shape of the lens, a size of the lens, a thickness of the lens, and the like included in the lens module illustrated in FIG. 5 are illustrative and are not limited thereto.

Referring to FIG. 5, the lens module 100 includes N lenses sequentially disposed from the object side to the image side.

Hereinafter, an example in which Nis 6 will be described, but the present invention is not limited thereto, and N may be a positive integer of 2 or more.

The lens module 100 includes the first lens L1, the second lens L2, the third lens L3, the fourth lens L4, the fifth lens L5, and the sixth lens L6, which are sequentially disposed from the object side to the image side, and in both surfaces of each of the lenses L1 to L6, a surface disposed to face the object side is referred to as one of object side surfaces L1S1 to L6S1, and a surface disposed to face the image side is referred to as one of image side surfaces L1S2 to L6S2.

According to the embodiment of the present invention, a coating layer is disposed on at least one of both surfaces of the lens. According to the embodiment of the present invention, a coating applied to some lenses among the plurality of lenses differs from a coating applied to the other lenses.

According to the embodiment of the present invention, at least one of the N lenses L1 to L6 is a first coated lens to which a first coating is applied, and at least one of the N lenses L1 to L6 is a second coated lens to which a second coating is applied. Here, at least one of a thickness, the number of layers, and a refractive index of the first coating may differ from at least one of a thickness, the number of layers, and a refractive index of the second coating.

Here, the first coating may be a coating optimized for a higher angle of incidence than that of the second coating. For example, a transmittance of the first coating at a first angle of incidence may be designed to be higher than a transmittance of the second coating at the first angle of incidence, and a transmittance of the first coating may be designed to be smaller than a transmittance of the second coating at a second angle of incidence lower than the first angle of incidence.

In one embodiment, the first angle of incidence may be 50° or more and preferably, in a range of 50° to 70°, and the second angle of incidence may be in a range of 0° or more and 40° or less and preferably, in a range of 0° or more and 20° or less. For example, the first coating may be a coating designed to have a transmittance of 95% or more at an angle of incidence of 50° or more, and the second coating may be a coating designed to have a transmittance of 99% or more at an angle of incidence of 0° to 40°. For example, the first coating may be a coating designed to have a transmittance of 95% or more at an angle of incidence of 60°, and the second coating may be a coating designed to have a transmittance of 99% or more at an angle of incidence of 0°.

In another embodiment, the first coated lens to which the first coating is applied has the highest light transmittance within an angle of incidence in a range of 30° or more and 60° or less, and the second coated lens to which the second coating is applied has the highest light transmittance within an angle of incidence in a range of 0° or more and less than 30°. For example, the first coated lens to which the first coating is applied may have the highest light transmittance within an angle of incidence in a range of 30° or more and 60° or less, and have a light transmittance lower than the highest light transmittance at other angles of incidence out of the range of 30° or more and 60° or less. The second coated lens to which the second coating is applied may have the highest light transmittance within an angle of incidence in a range of 0° or more and less than 30°, and have a light transmittance lower than the highest light transmittance at other angles of incidence out of the range of 0° or more and less than 30°. As another example, the first coated lens to which the first coating is applied may have the highest light transmittance at a specific angle of incidence belonging to a range of 30° or more and 60° or less, and the second coated lens to which the second coating is applied may have a lower light transmittance than the first coated lens at a specific angle of incidence at which the first coated lens has the highest light transmittance. Likewise, the second coated lens to which the second coating is applied may have the highest light transmittance at a specific angle of incidence belonging to a range of 0° or more and less than 30°, and the first coated lens to which the first coating is applied may have a lower light transmittance than the second coated lens at a specific angle of incidence at which the second coated lens has the highest light transmittance.

For example, the first coated lens to which the first coating is applied may have a lower light transmittance than the second coated lens to which the second coating is applied within an angle of incidence in a range of 0° or more and less than 30°, and the first coated lens to which the first coating is applied may have a light transmittance of 98% or more at an angle of incidence of 50°, and the second coated lens to which the second coating is applied may have a light transmittance of less than 98% at the angle of incidence of 50°. Alternatively, the first coated lens to which the first coating is applied may have a lower light transmittance than the second coated lens to which the second coating is applied within an angle of incidence in a range of 0° or more and less than 30°, and the first coated lens to which the first coating is applied may have a light transmittance of 95% or more at an angle of incidence of 60°, and the second coated lens to which the second coating is applied may have a light transmittance of less than 95% at the angle of incidence of 60°. Alternatively, the first coated lens to which the first coating is applied may have a lower light transmittance than the second coated lens to which the second coating is applied within an angle of incidence in a range of 0° or more and less than 30°, and the first coated lens to which the first coating is applied may have a light transmittance of 88% or more at an angle of incidence of 70°, and the second coated lens to which the second coating is applied may have a light transmittance of less than 88% at the angle of incidence of 70°.

Here, the angle of incidence may be an angle between a predetermined line at a predetermined angle with respect to an optical axis of the lens and a normal line of a contact point between the predetermined line and the surface of the lens. In this case, the predetermined angle may be determined according to a field of view (FOV) of the lens. For example, the predetermined angle may be ½ of the FOV of the lens. In addition, the predetermined line may denote an incident ray incident on the lens. In other words, the predetermined line may denote an incident ray parallel to the FOV of the lens.

Figure 6B:
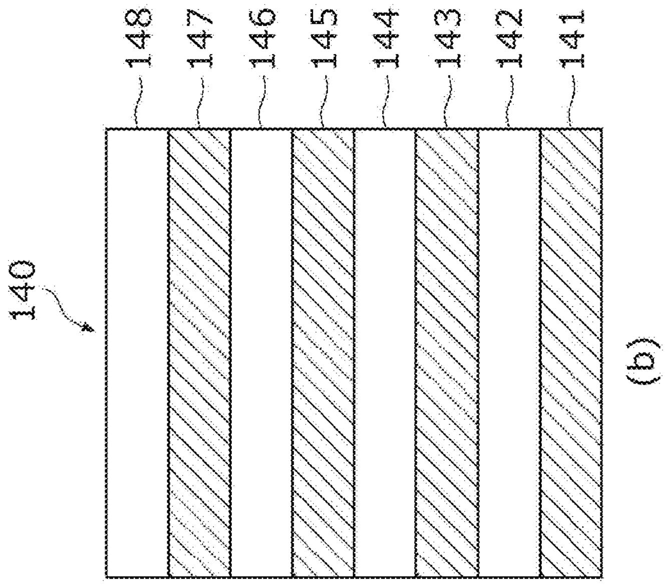
FIG. 6B is an example of a second coating according to one embodiment of the present invention.
Figure 6A:
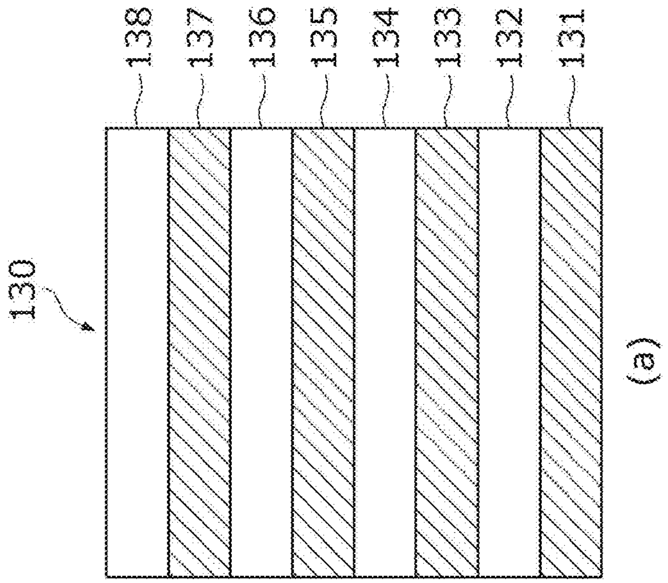
FIG. 6A is an example of a first coating according to one embodiment of the present invention.

FIG. 6A is an example of a first coating according to one embodiment of the present invention, and FIG. 6B is an example of a second coating according to one embodiment of the present invention.

Referring to FIG. 6A, a first coating 130 includes a first layer to an $X^{th}$ layer (here, X is a positive integer of 2 or more) sequentially disposed on the surface of the lens, and a second coating 140 includes a first layer to a $Y^{th}$ layer (here, Y is a positive integer of 2 or more) sequentially disposed on the surface of the lens. Based on the surface of the lens, a layer closest to the lens is a first layer, and a layer farthest from the lens is an $X^{th}$ layer or $Y^{th}$ layer.

In the specification, an example in which each of X and Y is 8 will be described, but the present invention is not limited thereto, and X and Y may be a different number.

According to one embodiment of the present invention, the first coating 130 is formed by repeatedly stacking a high refractive index layer and a low refractive index layer alternately four times, a first layer 131, a third layer 133, a fifth layer 135, and a seventh layer 137, which are the high refractive index layers, may include a first material, and a second layer 132, a fourth layer 134, a sixth layer 136, and an eighth layer 138, which are low refractive index layers, may include a second material. In this case, a refractive index of the first material may be greater than a refractive index of the second material. Both the first material and the second material may include an oxide. For example, the first material may include $TiO_2$ and the second material may include $SiO_2$. According to the embodiment of the present invention, the first layer 131 closest to the lens surface has a higher refractive index than the second layer 132.

The low refractive index layer may include $SiO_2$ with a refractive index of about 1.52 to 1.57. The high refractive index layer may include $TiO_2$ with a refractive index of about 2.55 to 2.87. In the embodiment of the present invention, specific refractive index information according to a wavelength (nm) is expressed in Table 2 below.

TABLE 2

| wavelength | 436 | 486 | 546 | 588 | 656 |
|---|---|---|---|---|---|
| SiO2 | 1.553766 | 1.549673 | 1.546145 | 1.544258 | 1.541862 |
| TiO2 | 2.852405 | 2.734737 | 2.652107 | 2.613923 | 2.571061 |

The first coating 130 according to the embodiment of the present invention may have the above-described configuration and at the same time, satisfy a thickness condition of a thickness of the sixth layer 136<a thickness of the fourth layer 134<a thickness of the second layer 132<a thickness of the eighth layer 138. In other words, the thickness of the fourth layer 134 may be greater than the thickness of the sixth layer 136, the thickness of the second layer 132 may be greater than the thickness of the fourth layer 134, and the thickness of the eighth layer 138 may be greater than the thickness of the second layer 132.

In addition, the coating layer 130 according to one embodiment of the present invention may satisfy a thickness condition of a thickness of the first layer 131<a thickness of the third layer 133<a thickness of the fifth layer 135<a thickness of the seventh layer 137. In other words, the thickness of the third layer 133 may be greater than the thickness of the first layer 131, the thickness of the fifth layer 135 may be greater than the thickness of the third layer 133, and the thickness of the seventh layer 137 may be greater than the thickness of the fifth layer 135.

According to one embodiment of the present invention, the second coating 140 is formed by repeatedly stacking a high refractive index layer and a low refractive index layer alternately four times, a first layer 141, a third layer 143, a fifth layer 145, and a seventh layer 147, which are the high refractive index layers, may include the first material, and a second layer 142, a fourth layer 144, a sixth layer 146, and an eighth layer 148, which are low refractive index layers, may include the second material. In this case, a refractive index of the first material may be greater than a refractive index of the second material. Both the first material and the second material may include an oxide. For example, the first material may include $TiO_2$ and the second material may include $SiO_2$.

The second coating 130 according to one embodiment of the present invention may have the above-described configuration and at the same time, satisfy a thickness condition of a thickness of the sixth layer 146<a thickness of the fourth layer 144<a thickness of the second layer 142<a thickness of the eighth layer 148. In other words, the thickness of the fourth layer 144 may be greater than the thickness of the sixth layer 146, the thickness of the second layer 142 may be greater than the thickness of the fourth layer 144, and the thickness of the eighth layer 148 may be greater than the thickness of the second layer 142.

In addition, the second coating 140 according to one embodiment of the present invention may satisfy a thickness condition of a thickness of the first layer 141<a thickness of the third layer 143<a thickness of the fifth layer 145<a thickness of the seventh layer 147. In other words, the thickness of the third layer 143 may be greater than the thickness of the first layer 141, the thickness of the fifth layer 145 may be greater than the thickness of the third layer 143, and the thickness of the seventh layer 147 may be greater than the thickness of the fifth layer 145.

According to the embodiment of the present invention, the total thickness of the first coating 130 is greater than the total thickness of the second coating 140. For example, the total thickness of the first coating 130 may be 1.05 times or more, preferably, 1.05 to 1.35 times, or 1.1 times or more, and preferably, 1.15 to 1.3 times the total thickness of the second coating 140. As the angle of incidence increases, an optical path length (OPL) changes and a phase of the reflected light also changes. As in the embodiment of the present invention, when the total thickness of the first coating 130 is greater than the total thickness of the second coating 130, the optical path increases, thereby enabling phase matching of the reflected light. Therefore, the first coating 130 may have a higher transmittance than the second coating 140 with respect to light with a high angle of incidence, for example, an angle of incidence of 50° or more.

To this end, in one embodiment, a thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140. For example, the thickness of the $X^{th}$ layer (e.g., the eighth layer 138), which is the uppermost layer of the first coating 130, may be 1.1 times or more and preferably, 1.15 to 1.3 times the thickness of the $Y^{th}$ layer (e.g., the eighth layer 148), which is the uppermost layer of the second coating 140.

Alternatively, the thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140, and a thickness of an $(X-1)^{th}$ layer (e.g., the seventh layer 137), which is a first lower layer of the uppermost layer of the first coating 130, may be greater than a thickness of a $(Y-1)^{th}$ layer (e.g., the seventh layer 147), which is a first lower layer of the uppermost layer of the second coating 140.

Alternatively, the total thickness of the second layer 132, the fourth layer 134, the sixth layer 136, and the eighth layer 138, which are the low refractive index layers of the first coating 130, may be greater than the total thickness of the second layer 142, the fourth layer 144, the sixth layer 146, and the eighth layer 148, which are the low refractive index layers of the second coating 140.

Alternatively, the thickness of each of the second layer 132, the fourth layer 134, the sixth layer 136, and the eighth layer 138, which are the low refractive index layers of the first coating 130, may be greater than the thickness of each of the second layer 142, the fourth layer 144, the sixth layer 146, and the eighth layer 148, which are the low refractive index layers of the second coating 140. Therefore, since an increase in optical path and phase matching with respect to light with a high angle of incidence, for example, an angle of incidence of 50° or more, the first coating 130 may have a higher transmittance than the second coating 140.

For example, the thickness of the fourth layer 134 of the first coating 130 may be in a range of 45 to 65 nm and preferably, 50 to 63 nm, the thickness of the fifth layer 135 may be in a range of 30 to 45 nm and preferably, 32 to 43 nm, the thickness of the sixth layer 136 may be in a range of 8 to 17 nm and preferably, 10 to 14 nm, the thickness of the seventh layer 137 may be in a range of 50 to 70 nm and preferably, 58 to 66 nm, and the thickness of the eighth layer 138 may be in a range of 93 to 106 nm and preferably, 103 to 105 nm.

In addition, the first coating 130 may additionally satisfy a condition in which the thickness of the second layer is in a range of 88 to 102 nm and the thickness of the third layer is in a range of 13 to 18 nm. In this case, since the application of the first coating 130 increases a transmittance in a region in which the angle of incidence is 50° or more, the effect of increasing the relative illumination can be more excellent.

In addition, the first coating 130 may be formed to have the smallest thickness of the first layer 131. In other words, the first layer 131 may be formed to be smaller than the thicknesses of the second layer to the eighth layer.

For example, the thickness of the fourth layer 144 of the second coating 140 may be in a range of 38 to 43 nm and preferably, 40 to 41 nm, the thickness of the fifth layer 145 may be in a range of 30 to 45 nm and preferably, 43 to 45 nm, the thickness of the sixth layer 146 may be in a range of 4 to 7 nm and preferably, 5 to 6 nm, the thickness of the seventh layer 147 may be in a range of 50 to 56 nm and preferably, 52 to 54 nm, and the thickness of the eighth layer 148 may be in a range of 80 to 90 nm and preferably, 84 to 88 nm.

In addition, the second coating 140 may additionally satisfy a condition in which the thickness of the second layer 142 is in a range of 70 to 80 nm and preferably, 74 to 77 nm, and the thickness of the third layer 143 is in a range of 13 to 18 nm and preferably, 15 to 17 nm.

In addition, the second coating 140 may be formed to have the smallest thickness of the first layer 141. In other words, the first layer 141 may be formed to be smaller than the thicknesses of the second layer to the eighth layer.

Therefore, the first coating 130 can be optimized for a higher angle of incidence than the second coating 140. For example, the first coating 130 may have a transmittance of 95% or more for light incident at an angle of incidence of 60°, and the second coating 140 may have a transmittance of 99% or more for light incident at an angle of incidence of 0°.

As another embodiment, the thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140. For example, the thickness of the $X^{th}$ layer (e.g., the eighth layer 138), which is the uppermost layer of the first coating 130, may be 1.1 times or more and preferably, 1.15 to 1.3 times the thickness of the $Y^{th}$ layer (e.g., the eighth layer 148), which is the uppermost layer of the second coating 140.

Alternatively, the thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140, and a thickness of an $(X-2)^{th}$ layer (e.g., the sixth layer 136), which is a first lower layer of the uppermost layer of the first coating 130, may be greater than a thickness of a $(Y-2)^{th}$ layer (e.g., the seventh layer 146), which is a first lower layer of the uppermost layer of the second coating 140.

Alternatively, the thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140, a thickness of an $(X-2)^{th}$ layer (e.g., the sixth layer 136), which is a second lower layer of the uppermost layer of the first coating 130, may be greater than a thickness of a $(Y-2)^{th}$ layer (e.g., the sixth layer 146), which is a second lower layer of the uppermost layer of the second coating 140, and the $(X-1)^{th}$ layer (e.g., the seventh layer 137), which is the first lower layer of the uppermost layer of the first coating 130, may be greater than the thickness of the $(Y-1)^{th}$ layer (e.g., the seventh layer 147), which is the first lower layer of the uppermost layer of the second coating 140.

Alternatively, the thickness of the $X^{th}$ layer (e.g., the eighth layer 138), which is the uppermost layer of the first coating 130, may be greater than the thickness of the $Y^{th}$ layer (e.g., the eighth layer 148), which is the uppermost layer of the second coating 140, the thickness of the $(X-2)^{th}$ layer (e.g., the sixth layer 136), which is the second lower layer of the uppermost layer of the first coating 130, may be greater than the thickness of a $(Y-2)^{th}$ layer (e.g., the sixth layer 146), which is the second lower layer of the uppermost layer of the second coating 140, and a thickness of at least one of an $(X-3)^{th}$ layer (e.g., the fifth layer 135) and an $(X-5)^{th}$ layer (e.g., the third layer 135) of the first coating 130 may be smaller than a thickness of at least one of a $(Y-3)^{th}$ layer (e.g., the fifth layer 145) and a $(Y-5)^{th}$ layer (e.g., the third layer 143) of the second coating 140.

Alternatively, the total thickness of even-numbered layers, that is, the second layer 132, the fourth layer 134, the sixth layer 136, and the eighth layer 138, which are the low refractive index layers of the first coating 130, may be greater than the total thickness of the second layer 142, the fourth layer 144, the sixth layer 146, and the eighth layer 148, which are the low refractive index layers of the second coating 140.

Alternatively, the thickness of each of the even-numbered layers, that is, the second layer 132, the fourth layer 134, the sixth layer 136, and the eighth layer 138, which are the low refractive index layers of the first coating 130, may be greater than the thickness of each of the second layer 142, the fourth layer 144, the sixth layer 146, and the eighth layer 148, which are the low refractive index layers of the second coating 140.

In this case, a thickness of at least one of odd-numbered layers, that is, the first layer 131, the third layer 133, the fifth layer 135, and the seventh layer 137, which are the high refractive index layers of the first coating 130, may be smaller than a thickness of at least one of the first layer 141, the third layer 143, the fifth layer 145, and the seventh layer 147, which are the high refractive index layers of the second coating 140.

Therefore, since phase matching according to an increase in optical path with respect to light with a high angle of incidence is possible, the first coating 130 may have a higher transmittance than the second coating 140, and since an optical path in the low refractive index layer increases, it is possible to minimize loss of the light transmittance due to the increase in optical path.

In this case, the thickness of the first layer 131 of the first coating 130 may be smaller than the thickness of each of the second layer to the eighth layer of the first coating 130, and the thickness of the first layer 141 of the second coating 140 may be smaller than the thickness of each of the second layer to the eighth layer of the second coating 140.

More specifically describing the first coating 130 according to the embodiment of the present invention based on the thickness of the first layer 131, the total thickness of the first coating 130 may be 70 to 90 times the thickness of the first layer 131. In this case, the thickness of the $X^{th}$ layer 138 among the first layer to the $X^{th}$ layer 131 to 138 may be 19 times or more and preferably, in a range of 19 times or more and 22 times or less the thickness of the first layer 131, and the thickness of the $(X-2)^{th}$ 136 among the first layer to the $X^{th}$ layer 131 to 138 may be 1.5 times or more and preferably, in a range of 1.5 times or more and 6 times or less the thickness of the first layer 131.

Alternatively, the thickness of the second layer 132 among the first layer to the $X^{th}$ layer 131 to 138 may be 18 times or more and preferably, in a range of 18 times or more and 25 times or less thickness of the first layer 131. Alternatively, the thickness of the $(X-1)^{th}$ layer 137 among the first layer to the $X^{th}$ layer 131 to 138 may be 12.5 times or more and preferably, in a range of 12.5 times or more and 15 times or less thickness of the first layer 131. Alternatively, the thickness of the $(X-3)^{th}$ layer 135 among the first layer to the $X^{th}$ layer 131 to 138 may be 7.5 times or less and preferably, in a range of 3 times or more and 7.5 times or less the thickness of the first layer 131, and the thickness of the $(X-5)^{th}$ 133 among the first layer to the $X^{th}$ layer 131 to 138 may be 3 times or less and preferably, in a range of 1.5 times or more and 3 times or less the thickness of the first layer 131.

Therefore, it is possible to optimize the light transmittance for light with the angle of incidence of 50° or more while minimizing loss of the light transmittance due to the increase in optical path within the coating layer, thereby increasing the relative illumination.

Meanwhile, according to the embodiment of the present invention, as described above, at least one of the N lenses L1 to L6 is the first coated lens to which the first coating 130 is applied, and at least one of the N lenses L1 to L6 is the second coated lens to which the second coating 140 different from the first coating 130 is applied. Here, the first coated lens may be a lens to which the first coating 130 is applied to at least one of the object side surface and the image side surface of the lens. For example, the first coated lens may be the lens to which the first coating 130 is applied to the object side surface and the image side surface of the lens. The second coated lens may be a lens to which the second coating 140 is applied to at least one of the object side surface and the image side surface of the lens. For example, the second coated lens may be the lens to which the second coating 140 is applied to the object side surface and the image side surface of the lens.

According to the embodiment of the present invention, the first coated lens to which the first coating 130 is applied may be a high-angle lens. For example, when some of the N lenses included in the lens module 100 according to the embodiment of the present invention are high-angle lenses, the first coated lens may be all or some of the high-angle lenses. In addition, the second coated lens may be all or some of the remaining lenses other than the first coated lens among the N lenses.

Figure 7:
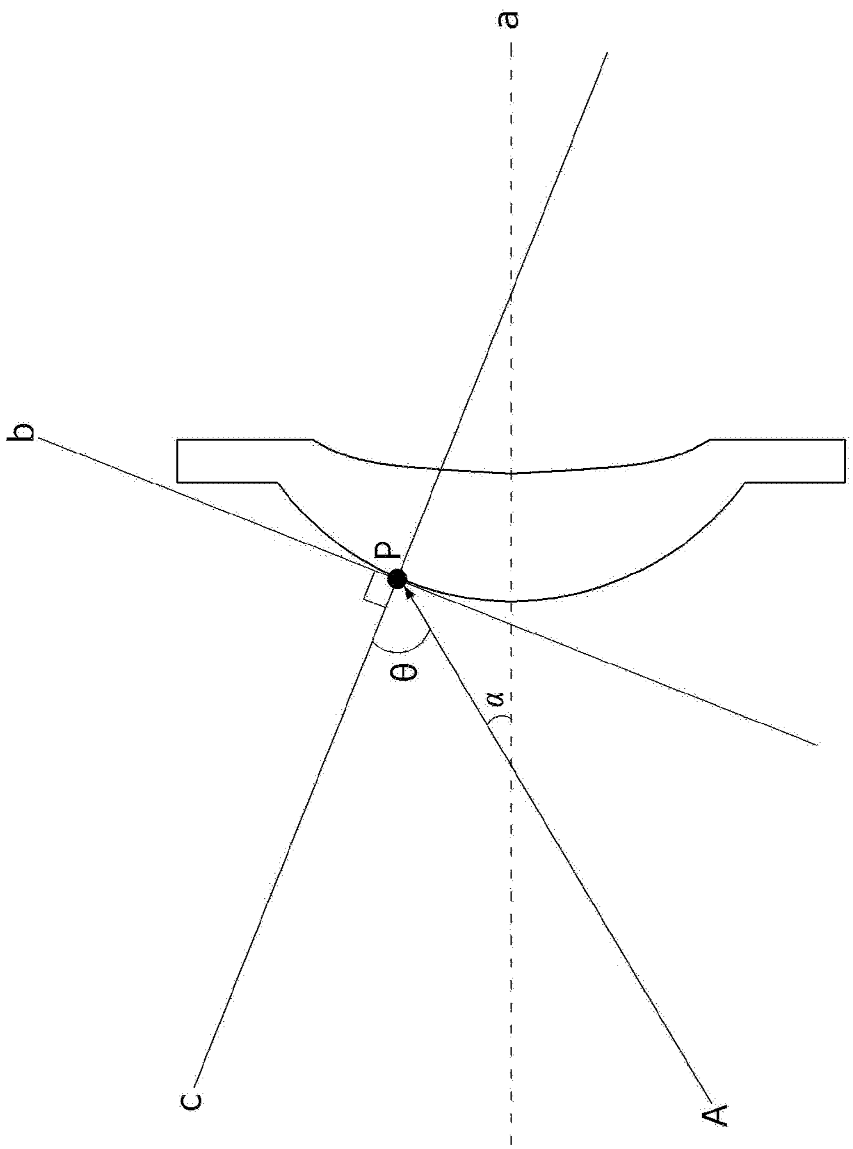
FIG. 7 is a view for describing an angle of incidence of the lens.
Figure 8:
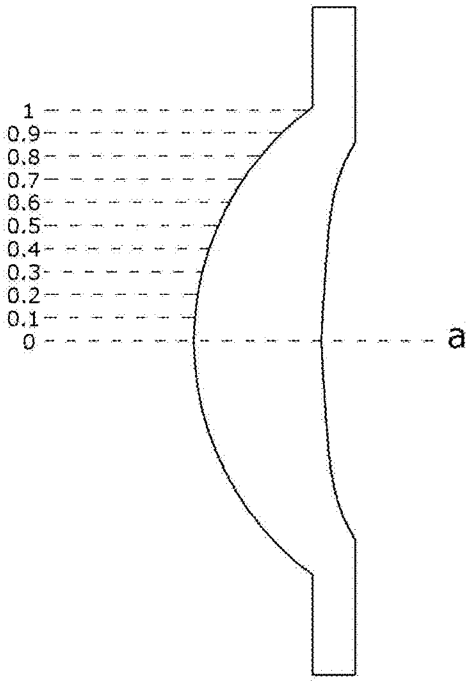
FIG. 8 is a view for describing the angle of incidence of the lens for each field.

In the specification, the high-angle lens is a lens of which an angle θ (hereinafter referred to as angle of incidence) of incident light is 50° or more. In other words, the high-angle lens is a lens in which a region in which the angle θ between a line at a predetermined angle with respect to an optical axis and a normal line of a point at which the line comes into contact with the object side surface of the lens is 50° or more is present. In other words, the high-angle lens is the lens in which the region in which the angle θ between the line at the predetermined angle with respect to the optical axis and the normal line of the point at which the line comes into contact with the object side surface of the lens is 50° or more occupies 30% or more of an area of the object side surface. FIG. 7 is a view for describing an angle of incidence of the lens, FIG. 8 is a view for describing the angle of incidence of the lens for each field, and FIGS. 9A-9K are results of calculating the angle of incidence of the lens for each field in the lens module according to one embodiment of the present invention.

Referring to FIG. 7, "high-angle lens" is a lens in which the region in which the angle θ between a first line A with a first angle (a in FIG. 7) with respect to an optical axis (line a in FIG. 7) of the lens and a normal line (line c in FIG. 7) of a point P at which the first line comes into contact with the lens is present and preferably, the lens in which the region in which the angle θ between the first line A with the first angle (a in FIG. 7) with respect to the optical axis (line a in FIG. 7) of the lens and a normal line (line c in FIG. 7) of the point P at which the first line comes into contact with the lens occupies 30% or more of the area of the surface of the lens. Here, the first angle may depend on the FOV of the lens. For example, the first angle may be ½ of the FOV of the lens. The first line may be an incident ray that enters parallel to the FOV of the lens. Therefore, the first line may be a line parallel to the FOV line of the lens or a field of view line. At the time of satisfying that the first line forms the first angle with the optical axis, a distance between the first line and the lens does not affect the high-angle lens. In other words, when the first line forms the first angle with the optical axis regardless the first line is positioned close to the lens or far from the lens, and the angle θ of the normal line (line c in FIG. 7) of the point at which the first line comes into contact with the lens is 50° or more, the lens satisfies the high-angle lens condition.

The angle of incidence may be calculated for each field. In other words, as illustrated in FIGS. 8 and 9, angles of incidence at contact points between the first line and the lens may be calculated in units of 0.1 field based on the center of the lens (i.e., field 0 of the image sensor). Here, based on the optical axis a, 0 is a point on the lens (e.g., a center portion of the lens) corresponding to field 0 of the image sensor and 1 is a point on the lens corresponding to field 1 of the image sensor, and based on the optical axis a, 10 points spaced an equal distance from each other from point 0 to point 1 may correspond to points between the field 0 and field 1 of the image sensor in units of 0.1 field. In FIGS. 9A to 9K, an angle of incidence and a refractive angle with respect to the FOV line of the lens are measured in units of 0.1 field between the field 0 and the field 1, and a case corresponding to the high angle is shaded. Specifically, a result of measuring angles for each position Chief, Y+, Y−, X+, and X− at which light enters as illustrated in FIG. 2 is illustrated.

In the specification, when there is a point in which the angle of incident light is 50° or more in any field between fields 0 and 1, in a lens, the lens is defined as a high-angle lens. Accurately, a lens with at least one first line that satisfies the above condition is defined as a high-angle lens. In other words, when there is a place in which the angle θ between the normal line and the first line on the surface among all surfaces of the lens is 50° or more, the lens satisfies the condition of the high-angle lens.

Referring to FIGS. 9A to 9K, the first lens L1, the second lens L2, the third lens L3, the fourth lens L4, and the sixth lens L6 may be high-angle lenses.

According to the embodiment of the present invention, the first coated lens to which the first coating 130 is applied may be all or some of the high-angle lenses in the lens module 100.

According to the embodiment of the present invention, the first coated lens to which the first coating 130 is applied may be the first lens L1, which is a high-angle lens closest to the object side among the first lens L1, the second lens L2, the third lens L3, the fourth lens L4, and the sixth lens L6, which are the high-angle lenses within the lens module 100, and all or some of the remaining lenses except for the first coated lens may be the second coated lens to which the second coating 140 is applied.

Alternatively, according to the embodiment of the present invention, the first coated lens to which the first coating 130 is applied may be the first lens L1, which is the high-angle lens closest to the object side among the first lens L1, the second lens L2, the third lens L3, the fourth lens L4, and the sixth lens L6, which are the high-angle lenses within the lens module 100, and the second lens L2, which is another high-angle lens disposed consecutively with the first lens L1, and all or some of the remaining lenses except for the first coated lens may be the second coated lens to which the second coating 140 is applied.

Alternatively, according to the embodiment of the present invention, the first coated lens to which the first coating 130 is applied may be the first lens L1, which is a high-angle lens closest to the object side among the first lens L1, the second lens L2, the third lens L3, the fourth lens L4, and the sixth lens L6, which are the high-angle lenses within the lens module 100, and another high-angle lens disposed not to be consecutive with the first lens L1, and all or some of the remaining lenses except for the first coated lens may be the second coated lens to which the second coating 140 is applied.

Alternatively, according to the embodiment of the present invention, the first coated lens to which the first coating is applied may include a high-angle lens with the largest number of high-angle cases among the first lens L1, the second lens L2, the third lens L3, the fourth lens L4, and the sixth lens L6, which are the high-angle lenses within the lens module 100. Here, referring to FIGS. 9A to 9K illustrating that the angles of incidence are calculated in units of 0.1 field between field 0 and 1, the high-angle lens with the largest number of high-angle regions may be a lens with the largest number of fields in which the angle of incidence is 50° or more. Alternatively, the high-angle lens with the largest number of high-angle regions may be a lens with a widest region in which the angle of incidence is 50° or more.

Alternatively, according to the embodiment of the present invention, the first coated lens to which the first coating 130 is applied may include a lens with the highest angle of incidence among the first lens L1, the second lens L2, the third lens L3, the fourth lens L4, and the sixth lens L6, which are the high-angle lenses within the lens module 100. For example, referring to FIGS. 9A to 9K illustrating that the angles of incidence are calculated in units of 0.1 field between fields 0 and 1, the lens including the region with the highest angle of incidence may be the first coated lens.

As described above, when the first coating 130 according to the embodiment of the present invention is applied to some of the high-angle lenses and the second coating 140 is applied to the remaining lenses, a transmittance of light incident at a high angle is increased by the first coating 130, and thus it is possible to increase the amount of light of a peripheral portion without reducing the amount of light of a center portion.

Meanwhile, the lens module according to the embodiment of the present invention may be included in a camera module. In addition, the camera module including the lens module according to the embodiment of the present invention may be used in a display device. In other words, the lens module according to the embodiment of the present invention may be built into the display devices such as smartphones, tablet PCs, laptop computers, or PDAs.

In particular, the lens module according to the embodiment of the present invention may be disposed under a display panel and implemented as a front camera of the display device, and may provide relatively higher light transmittance without a separate hole in the display panel. In particular, when light enters at a high angle, it is possible to solve a problem of Fresnel loss and increased noise during correction due to the low relative illumination.

Figure 10:
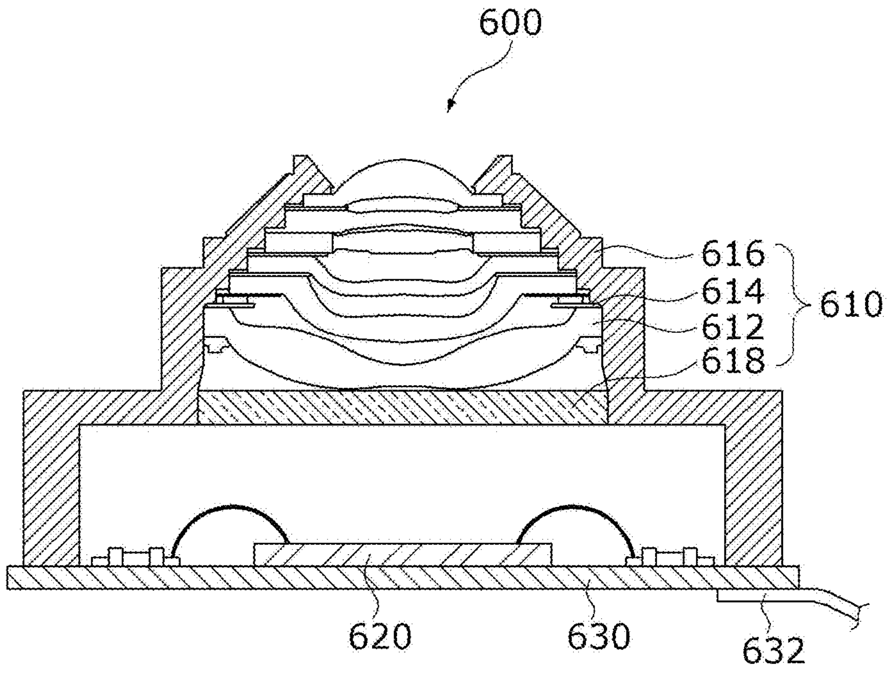
FIG. 10 is a cross-sectional view of a camera module including a lens module that is a usable type in the display device.

FIG. 10 is a cross-sectional view of a camera module including a lens module that is a usable type in the display device.

Referring to FIG. 10, a camera module 600 may include a lens module 610, an image sensor 620, and a printed circuit board 630, which are the same as the above-described components. Here, the lens module 610 may include a lens 612, a spacer 614, a lens holder 616, and a filter 618.

The lens 612 may be the above-descried lens of FIG. 1, but is not limited to the number (six) illustrated in FIG. 1. A plurality of lenses constituting the lens 612 may be aligned with respect to a central axis. Here, the central axis may be the same as the optical axis of the optical system. The spacer 614 is inserted between the lenses 612 and functions to maintain a distance between the lenses. The lens holder 616 may have a space in which a lens may be accommodated. One or more lenses 612, one or more spacers 614, and one or more lens holders 616 may be formed using other methods, such as using an adhesive (e.g., an adhesive resin such as an epoxy).

The filter 618 may be an IR filter. The lens module 610 may focus light coming from the image onto the image sensor 620 and generate an electrical signal using the focused input light signal. The image sensor 620 may be connected to a substrate such as a printed circuit board 630. One end portion of a cable 632 may be connected to the printed circuit board 630, and this connection may be made using materials known to those skilled in the art, such as a conductive adhesive or solder.

EXAMPLE

Hereinafter, a relative illumination according to the embodiment of the present invention was test on the surface of the lens according to a comparative example and examples.

In Examples, the first coating 130 according to one embodiment of the present invention was applied to some lenses of which an angle of incidence with respect to the FOV line of the lens is in a range of 50° to 70°, and in Comparative Examples, the second coating 140 was applied. K26R (Zeon corporation) was used in all lens substrate.

In Example 1, the first coating 130 was applied to both surfaces (two surfaces) of each of the first lens L1 and the second lens L2 in the lens module disposed as illustrated in FIG. 5, and the second coating 140 was applied to both surfaces of each of the remaining lenses, and in Example 2, the first coating 130 was applied to both surfaces (two surfaces) of each of the first lens L1 and the second lens L2, and the object side surface L3S1 of the third lens L3 in the lens module disposed as illustrated in FIG. 5, and the second coating 140 was applied to both surfaces of each of the remaining lenses.

In Comparative Example, the second coating 140 was applied to all surfaces of all lenses in the lens module disposed as illustrated in FIG. 5.

Results of measuring the illumination for each field position in Example 1, Example 2, and Comparative Example are expressed in Table 3 below. Table 3 shows a relative illumination based on field 0 set to 100%.

TABLE 3

| Field | Example 1 | Example 2 | Comparative Example 1 |
|---|---|---|---|
| −1 | 40.5% | 41.4% | 37.2% |
| −0.9 | 44.5% | 45.2% | 41.1% |
| −0.8 | 48.6% | 49.2% | 44.9% |
| −0.7 | 56.6% | 57.6% | 53.8% |
| −0.6 | 66.6% | 67.5% | 64.8% |
| −0.5 | 72.2% | 73.2% | 70.1% |
| −0.4 | 83.0% | 83.6% | 82.7% |
| −0.3 | 92.5% | 92.9% | 93.5% |
| −0.2 | 96.3% | 96.4% | 96.5% |
| −0.1 | 100.0% | 100.3% | 100.4% |
| 0 | 100.0% | 100.0% | 100.0% |
| 0.1 | 99.0% | 98.9% | 99.8% |
| 0.2 | 96.4% | 96.8% | 97.3% |
| 0.3 | 92.9% | 93.4% | 93.6% |
| 0.4 | 83.4% | 84.2% | 82.9% |
| 0.5 | 72.5% | 73.4% | 71.2% |
| 0.6 | 66.6% | 67.6% | 64.0% |
| 0.7 | 57.03% | 57.81% | 53.90% |
| 0.8 | 48.1% | 48.8% | 45.3% |
| 0.9 | 44.7% | 45.5% | 41.1% |
| 1 | 40.6% | 41.4% | 37.3% |

Therefore, in Examples 1 and 2, it can be seen that the illumination is high in a region of field 0 and a reduction in illumination is decreased toward a region of field 1.

Figure 11A:
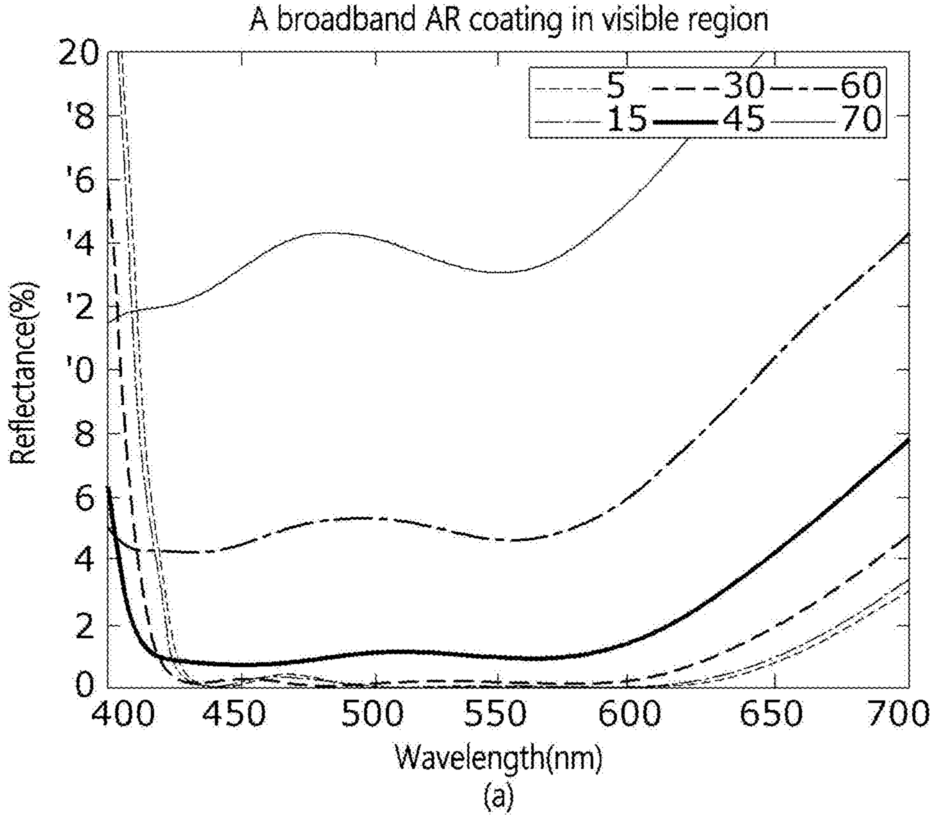
FIGS. 11A and 11B illustrate a result of measuring a reflectance (%) of a visible light region in Example 1 (see FIG. 11A) and Comparative Example 1 (see FIG. 11B).
Figure 11B:
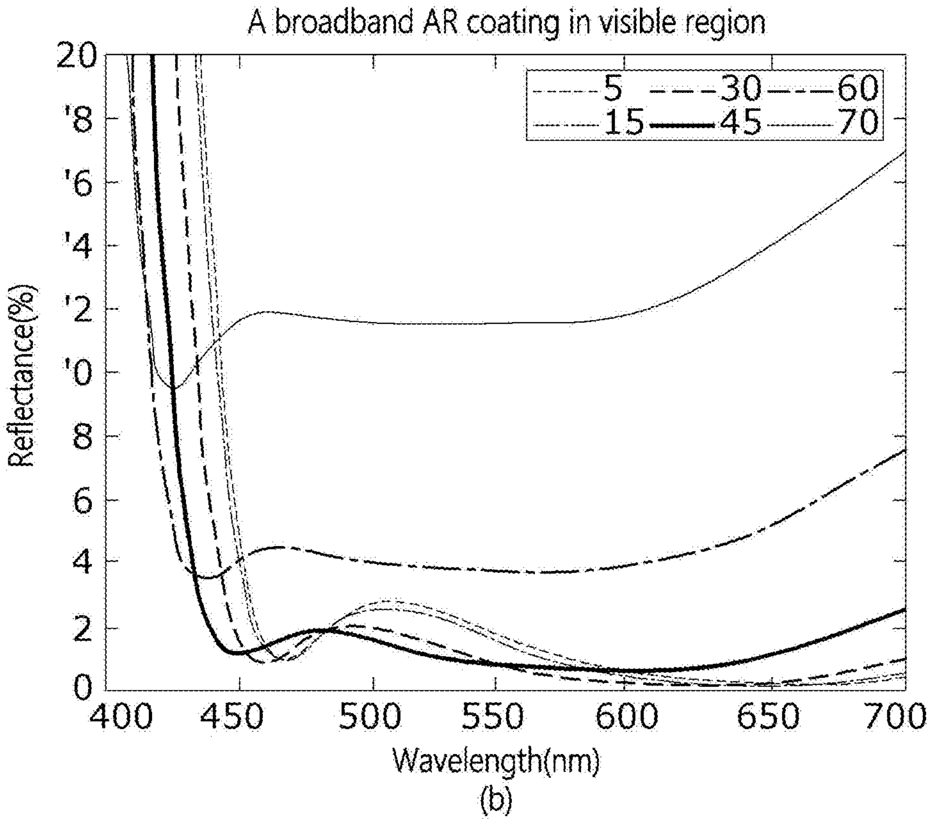
Figure 12:
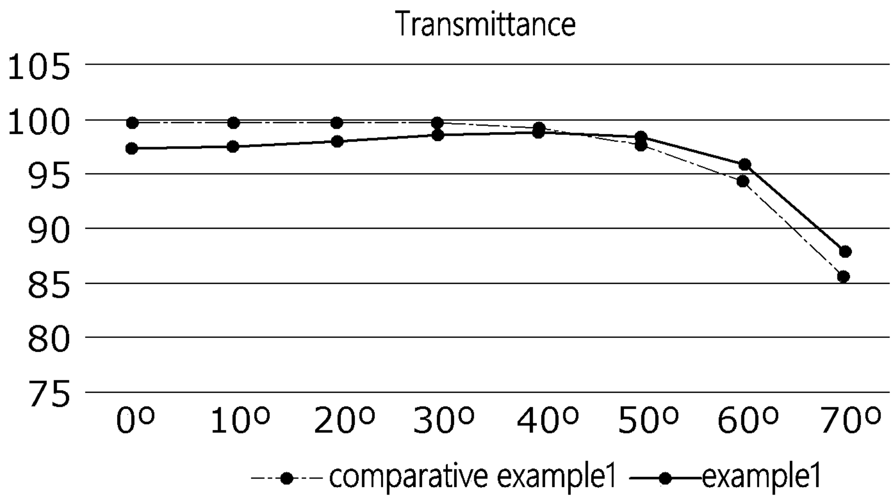
FIG. 12 illustrates a result of measuring a transmittance (%) for each angle of incidence with respect to each lens of Example 1 and Comparative Example 1.

In addition, FIGS. 11A and 11B illustrate a result of measuring a reflectance (%) of a visible light region in Example 1 (see FIG. 11A) and Comparative Example 1 (see FIG. 11B). A reflectance was measured by weighting the representative wavelengths of 436, 486, 546, 588, and 656 nm (wavelength (weight): 436 (6%), 486 (17%), 546 (38%), 588 (29%), and 656 (10%)). FIG. 12 illustrates a result of measuring a transmittance (%) for each angle of incidence with respect to each lens of Example 1 and Comparative Example 1.

Referring to FIGS. 11 and 12, it can be seen that in Example 1 compared to Comparative Example 1, a reflectance is low and a transmittance is high when light enters at a high angle of 50° or more in all visible light regions. Specifically, in Example 1 compared to Comparative Example 1, it could be seen that a transmittance at an angle of incidence of 50° was increased by about 0.60% (Comparative Example 1:97.81, and Example 1:98.41), a transmittance at an angle of incidence of 60° was increased by about 1.49% (Comparative Example 1:94.42 and Example 1:95.91), and a transmittance at an angle of incidence of 70° was increased by about 2.45% (Comparative Example 1:85.62 and Example 1:88.07).

Figure 13:
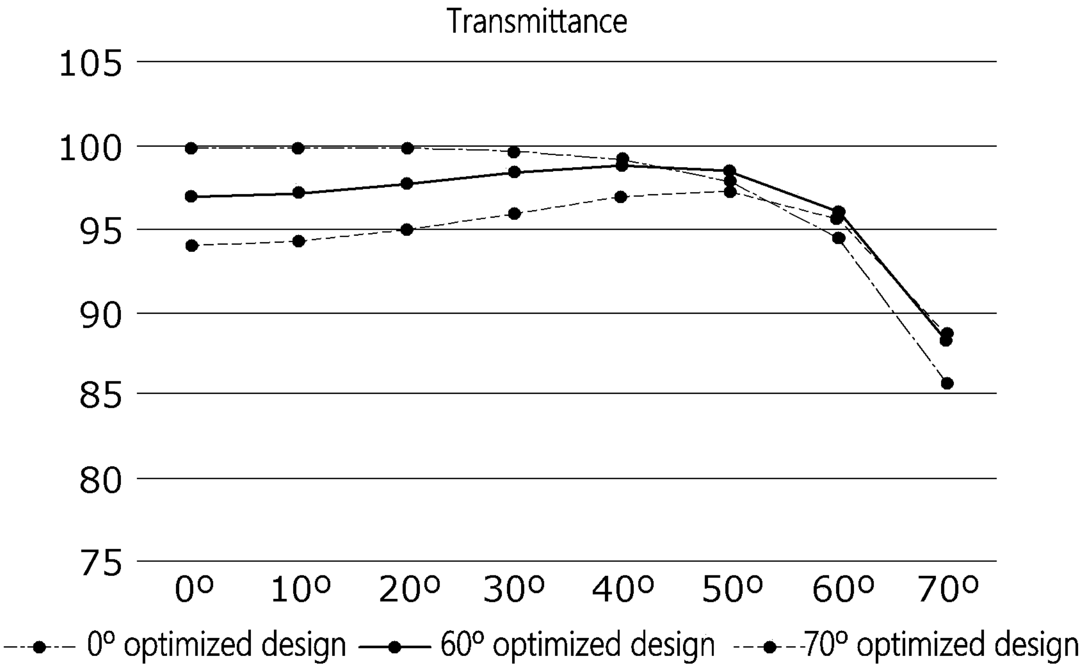
FIG. 13 is a result of simulating a light transmittance for each angle of incidence of a coating designed optimally for angles of incidence of 0°, 60°, and 70° according to the embodiment of the present invention.

Table 4 is a table showing a light transmittance for a thickness for each layer included in the coating optimized for angles of incidence of 0°, 20°, 40°, 50°, 60°, and 70° and optimized angles of incidence according to the embodiment of the present invention, and Table 5 and FIG. 13 are results of simulating the light transmittance for each angle of incidence of the coating optimally designed for the angles of incidence of 0°, 60°, and 70° according to the embodiment of the present invention. Here, the coating optimized for the angle of incidence of 0° means that the highest light transmittance is obtained at the angle of incidence of 0° through the comparison with the other coating. Likewise, the coating optimized for the angle of incidence of 60° means that the highest light transmittance is obtained at the angle of incidence of 60° through the comparison with the other coating, and the coating optimized for the angle of incidence of 70° means that the highest light transmittance is obtained at the angle of incidence of 70° through the comparison with the other coating. Here, the coating designed optimally for the angles of incidence of 50°, 60°, and 70° are some embodiments of the first coating 130 in the specification, and the coating designed optimally for the angles of incidence of 0°, 20°, and 40° are some embodiments of the second coating 140 in the specification.

TABLE 4

| | 0° | | 20° | | 40° | | 50° | | 60° | | 70° | |
|---|---|---|---|---|---|---|---|---|---|---|---|---|
| | Thickness (μm) | Thickness ratio to first layer | Thickness (μm) | Thickness ratio to first layer | Thickness (μm) | Thickness ratio to first layer | Thickness (μm) | Thickness ratio to first layer | Thickness (μm) | Thickness ratio to first layer | Thickness (μm) | Thickness ratio to first layer |
| Eighth layer | 86 | 17.2 | 89 | 17.8 | 94 | 18.8 | 98 | 19.6 | 103 | 20.6 | 107 | 21.4 |
| Seventh layer | 54 | 10.8 | 51 | 10.2 | 61 | 12.2 | 65 | 13 | 66 | 13.2 | 70 | 14 |
| Sixth layer | 5 | 1 | 5 | 1 | 5 | 1 | 9 | 1.8 | 13 | 2.6 | 23 | 4.6 |
| Fifth | 44 | 8.8 | 48 | 9.6 | 41 | 8.2 | 35 | 7 | 32 | 6.4 | 23 | 4.6 |

TABLE 4-continued

| | 0° | | 20° | | 40° | | 50° | | 60° | | 70° | |
|---|---|---|---|---|---|---|---|---|---|---|---|---|
| | Thick-ness (μm) | Thick-ness ratio to first layer | Thick-ness (μm) | Thick-ness ratio to first layer | Thick-ness (μm) | Thick-ness ratio to first layer | Thick-ness (μm) | Thick-ness ratio to first layer | Thick-ness (μm) | Thick-ness ratio to first layer | Thick-ness (μm) | Thick-ness ratio to first layer |
| layer | | | | | | | | | | | | |
| Fourth layer | 40 | 8 | 38 | 7.8 | 45 | 9 | 55 | 11 | 63 | 12.6 | 89 | 17.8 |
| Third layer | 16 | 3.2 | 17 | 3.4 | 16 | 3.2 | 14 | 2.8 | 13 | 2.6 | 9 | 1.8 |
| Second layer | 75 | 15 | 76 | 15.2 | 84 | 16.8 | 95 | 19 | 102 | 20.4 | 118 | 23.6 |
| First layer | 5 | 1 | 5 | 1 | 5 | 1 | 5 | 1 | 5 | 1 | 5 | 1 |
| Total thickness | 325 | 65 | 330 | 66 | 351 | 70.2 | 376 | 75.2 | 397 | 79.4 | 444 | 88.8 |
| Trans-mittance T (%) | 99.867 | | 99.851 | | 99.496 | | 98.618 | | 96.039 | | 88.625 | |

TABLE 5

| angle of incidence (°) | 0° optimized coating | 60° optimized coating | 70° optimized coating |
|---|---|---|---|
| 0 | 99.86512977 | 96.9360592 | 93.98247523 |
| 10 | 99.86170284 | 97.14358583 | 94.23734121 |
| 20 | 99.82364247 | 97.69931288 | 94.94613124 |
| 30 | 99.65952651 | 98.38582823 | 95.94543112 |
| 40 | 99.16496663 | 98.82967933 | 96.91647404 |
| 50 | 97.85365846 | 98.45455917 | 97.24884878 |
| 60 | 94.47290489 | 96.03927278 | 95.63223742 |
| 70 | 85.6787235 | 88.25589268 | 88.62457821 |

Thicknesses and light transmittances for each layer in the coating designed optimally for the angles of incidence of 0°, 20°, 40°, 50°, 60°, and 70° are expressed in Table 4. However, Table 4 is only a portion of the embodiment of the present invention and is not dependent on the values in Table 4. Referring to Table 4, it can be seen that the total thickness of the first coating (e.g., 50°, 60°, and 70° optimized coating) is 1.05 times or more the total thickness of the second coating (e.g., 0°, 20°, and 40° optimized coating). Referring to Table 5 and FIG. 13, it can be seen that the first coating (e.g., 60° and 70° optimized coating) has the highest light transmittance within the angle of incidence in a range of 30° and 60°, and the second coating (e.g., 0° optimized coating) has the highest transmittance within the angle of incidence in a range of 0° and 30°. More specifically, referring to FIG. 13, it can be seen that the 60° optimized coating has a higher light transmittance than the 0° optimized coating or the 70° optimized coating when the angle of incidence is 60°, the 70° optimized coating has a higher light transmittance than the 0° optimized coating or the 60° optimized coating when the angle of incidence is 70°, the 0° optimized coating has a higher light transmittance than the 60° optimized coating or the 70° optimized coating when the angle of incidence is 0°. For example, when the 60° optimized coating is applied to the high-angle lens (e.g., a lens in which a region in which an angle of incidence is 60° is present), it is possible to increase the relative illumination of the corresponding lens, and when the 70° optimized coating is applied to the high-angle lens (e.g., a lens in which a region in which an angle of incidence is 70° is present), it is possible to increase the relative illumination of the corresponding lens. When the lens module includes a plurality of lenses, the 50° or more optimized coating is applied to some of the high-angle lenses, and when the 40° or less optimized coating is applied to the remaining lenses, it is possible to increase the relative illumination while maintaining a high illumination of the center portion.

Referring back to Table 4, it can be seen that in the coating optimized for the angles of incidence of 0°, 20°, 40°, 50°, 60°, and 70°, the thickness of the first layer disposed closest to the surface of the lens is smaller than the thickness of the other layers. In addition, it can be seen that the thicknesses of the sixth layer to the eighth layer in the 50°, 60° and 70° optimized coating are greater than the thicknesses of the sixth layer to the eighth layer in the 0°, 20° 40°, and 50° optimized coating, and the thicknesses of the third layer to the fifth layer in the 60° and 70° optimized coating are smaller than the thicknesses of the third layer to the fifth layer in the 0°, 20°, and 40° optimized coating.

It can be seen that the total thickness of the coating layers is in a range of 70 to 90 times and preferably, 75 to 90 times the thickness of the first layer in the 50°, 60°, and 70° optimized coating, but the total thickness of the coating layers is 70 times or less the thickness of the first layer in the 0°, 20° and 40° optimized coating.

In addition, it can be seen that the thickness of the eighth layer is 19 times or more the thickness of the first layer in the 50°, 60°, and 70° optimized coating, and the thickness of the eighth layer is smaller than 19 times the thickness of the first layer in the 0°, 20° and 40° optimized coating.

It can be seen that the thickness of the sixth layer is 1.5 times or more the thickness of the first layer in the 50°, 60°, and 70° optimized coating, and the thickness of the sixth layer is smaller than 1.5 times the thickness of the first layer in the 0°, 20° and 40° optimized coating.

It can be seen that the thickness of the second layer is 18 times or more the thickness of the first layer in the 50°, 60°, and 70° optimized coating, and the thickness of the second layer is smaller than 18 times the thickness of the first layer in the 0°, 20° and 40° optimized coating.

It can be seen that the thickness of the seventh layer is 12.5 times or more the thickness of the first layer in the 50°, 60°, and 70° optimized coating, and the thickness of the second layer is smaller than 12.5 times the thickness of the first layer in the 0°, 20° and 40° optimized coating.

It can be seen that the thickness of the fifth layer is 7.5 times or less the thickness of the first layer in the 50°, 60°, and 70° optimized coating, the thickness of the fifth layer exceeds 7.5 times the thickness of the first layer in the 0°, 20° and 40° optimized coating, the thickness of the third layer is 3 times or less the thickness of the first layer in the 50°, 60°, and 70° optimized coating, and the thickness of the third layer exceeds 3 times the thickness of the first layer in the 0°, 20° and 40° optimized coating.

As described above, in an embodiment of the present invention, it is possible to obtain the coating layer with optimized light transmittance for each angle of incidence, and by combining the coating layers with optimized light transmittance for each angle of incidence, it is possible to obtain the lens module with the improved relative illumination without reducing the light amount of the center portion.

In particular, according to the embodiment of the present invention, by making the thickness of the low refractive index layer greater as the target optimized angle of incidence increases, it is possible to minimize the reduction in the light transmittance due to the increase in optical path while enabling phase matching between incident light and reflected light.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

DESCRIPTION OF REFERENCE NUMERALS

100: lens module
110: lens
L1: first lens
L2: second lens
L3: third lens
L4: fourth lens
L5: fifth lens
L6: sixth lens
170: image sensor
190: filter

The invention claimed is:

1. A lens module comprising N lenses disposed sequentially from an object side to an image side thereof, wherein the N lenses include:

a plurality of first coated lenses in which a first coating is applied to at least one surface thereof; and a plurality of second coated lenses in which a second coating is applied to at least one surface thereof, wherein the plurality of first coated lenses are a first lens and a second lens among the N lenses, wherein the plurality of second coated lenses are the remaining lenses among the N lenses except for the first lens and the second lens, wherein the first lens is disposed closest to the object side, wherein a thickness of the first coating is greater than a thickness of the second coating, wherein the plurality of first coated lenses are lenses in which an angle (θ) between a line at a predetermined angle with respect to an optical axis and a normal line of a point at which the line comes into contact with an object side surface is 50° or more, and wherein at least one of the plurality of first coated lenses has a highest light transmittance within an angle of incidence in a range of 30° or more and 60° or less, and at least one of the plurality of second coated lenses has a highest light transmittance within an angle of incidence in a range of 0° or more and less than 30°.

2. The lens module of claim 1, a difference between the thickness of the first coating and the thickness of the second coating is 10% or more of the thickness of the second coating.

3. The lens module of claim 1, wherein the first coating is applied to the object side surface and an image side surface of at least one of the plurality of first coated lenses, and the second coating is applied to an object side surface and an image side surface of at least one of the plurality of second coated lenses.

4. The lens module of claim 1, wherein a transmittance of the first coating at an angle of incidence of 50° or more is higher than a transmittance of the second coating at an angle of incidence of 50° or more, and a transmittance of the first coating at an angle of incidence of 0° or more and 40° or less is lower than a transmittance of the second coating at an angle of incidence of 0° or more and 40° or less.

5. A lens module comprising N lenses disposed sequentially from an object side to an image side thereof, wherein the N lenses include:

a first coated lens to which a first coating is applied; and a second coated lens to which a second coating is applied, wherein the first coated lens is disposed closest to the object side, wherein a thickness of the first coating is greater than a thickness of the second coating, wherein the first coating includes a first layer to an $X^{th}$ layer disposed sequentially on a surface of a lens, wherein the second coating includes a first layer to a $Y^{th}$ layer disposed sequentially on a surface of a lens, wherein the first layer has the smallest thickness among the first layer to the $X^{th}$ layer in the first coating, wherein the first layer has the smallest thickness among the first layer to the $Y^{th}$ layer in the second coating, wherein a thickness of the $X^{th}$ layer of the first coating is greater than a thickness of the $Y^{th}$ layer of the second coating, and wherein the first coated lens has a highest light transmittance within an angle of incidence in a range of 30° or more and 60° or less, and the second coated lens has a highest light transmittance within an angle of incidence in a range of 0° or more and less than 30°.

6. The lens module of claim 5, wherein a thickness of an $(X-1)^{th}$ layer of the first coating is greater than a thickness of a $(Y-1)^{th}$ layer of the second coating.

7. The lens module of claim 5, wherein a difference between the thickness of the first coating and the thickness of the second coating is 10% or more of the thickness of the second coating.

8. The lens module of claim 5, wherein a value of the X and a value of the Y are the same.

9. The lens module of claim 8, wherein the value of each of the X and the Y is 8.

10. The lens module of claim 9, wherein a first layer, a third layer, a fifth layer, and a seventh layer of each of the first coating and the second coating are formed of a first material, a second layer, a fourth layer, a sixth layer, and an eighth layer of each of the first coating and the second coating are formed of a second material, and a refractive index of the first material is greater than a refractive index of the second material.

11. The lens module of claim 10, wherein each of the first material and the second material includes an oxide.

12. The lens module of claim 5, wherein an object side surface and an image side surface of the first coated lens include the first coating, and an object side surface and an image side surface of the second coated lens include the second coating.

13. The lens module of claim 5, wherein a transmittance of the first coating at an angle of incidence of 50° or more is higher than a transmittance of the second coating at an angle of incidence of 50° or more, and a transmittance of the first coating at an angle of incidence of 0° or more and 40° or less is lower than a transmittance of the second coating at an angle of incidence of 0° or more and 40° or less.

* * * * *